United States Patent
Flory et al.

(10) Patent No.: US 7,787,026 B1
(45) Date of Patent: Aug. 31, 2010

(54) CONTINUOUS BURST MODE DIGITAL CAMERA

(75) Inventors: Kevin Flory, Livermore, CA (US); Hung Do, Fremont, CA (US); William Stemper, San Jose, CA (US); Yasu Noguchi, Sunnyvale, CA (US); Steven D. Loi, San Jose, CA (US)

(73) Assignee: Media Tek Singapore Pte Ltd., Singapore (SG)

( * ) Notice: Subject to any disclaimer, the term of this patent is extended or adjusted under 35 U.S.C. 154(b) by 1182 days.

(21) Appl. No.: 10/981,213

(22) Filed: Nov. 4, 2004

Related U.S. Application Data

(60) Provisional application No. 60/566,545, filed on Apr. 28, 2004.

(51) Int. Cl.
*H04N 5/76* (2006.01)
*H04N 3/14* (2006.01)
*H04N 9/083* (2006.01)
*G06K 9/32* (2006.01)

(52) U.S. Cl. .................. 348/231.99; 348/273; 348/280; 382/300

(58) Field of Classification Search ............. 348/231.99
See application file for complete search history.

(56) References Cited

U.S. PATENT DOCUMENTS

| | | | |
|---|---|---|---|
| 6,563,535 B1 | 5/2003 | Anderson ................ | 348/231.2 |
| 6,629,161 B2 | 9/2003 | Matsuki et al. ............... | 710/22 |
| 6,636,629 B1 | 10/2003 | Sasai .......................... | 382/167 |
| 6,642,962 B1 | 11/2003 | Lin et al. .................... | 348/252 |
| 6,754,279 B2 | 6/2004 | Zhou et al. ............. | 375/240.28 |
| 2002/0036830 A1* | 3/2002 | Schofield et al. ........... | 359/601 |
| 2002/0041761 A1* | 4/2002 | Glotzbach et al. .......... | 396/429 |
| 2003/0169278 A1 | 9/2003 | Obrador ..................... | 345/629 |
| 2003/0222998 A1 | 12/2003 | Yamauchi et al. .......... | 348/262 |
| 2004/0023612 A1* | 2/2004 | Kriesel ....................... | 452/157 |
| 2004/0032615 A1* | 2/2004 | Kurakata .................... | 358/1.15 |
| 2005/0068812 A1* | 3/2005 | Oh .............................. | 365/193 |

\* cited by examiner

*Primary Examiner*—Jason Chan
*Assistant Examiner*—Joel Fosselman
(74) *Attorney, Agent, or Firm*—Joseph S. Spano; Imperium Patent Works

(57) ABSTRACT

A camera has a continuous full-resolution burst mode wherein a sequence of full-resolution images is captured, is image processed by a pipeline of dedicated hardware image processing engines, is zoomed by a zoom engine, is compressed by a compression engine, and is stored into nonvolatile storage as a sequence of discrete files. The capturing of images and the storing of files continues at a rate of at least three frames per second until the user indicates burst mode operation is to stop or until nonvolatile storage becomes filled. Although the camera has a buffer memory into which raw sensor data is placed before image processing, the number of images that can be captured in a single burst is not limited by the size of the buffer memory. The cost of a consumer market camera having continuous burst mode capability is therefore reduced by reducing the required amount of buffer memory.

20 Claims, 23 Drawing Sheets

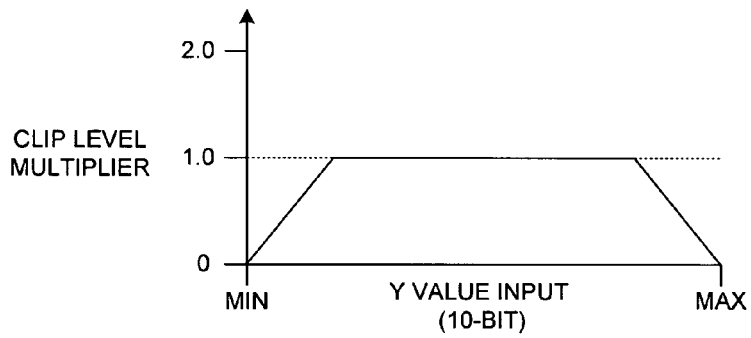
FIG. 18
FIG. 19
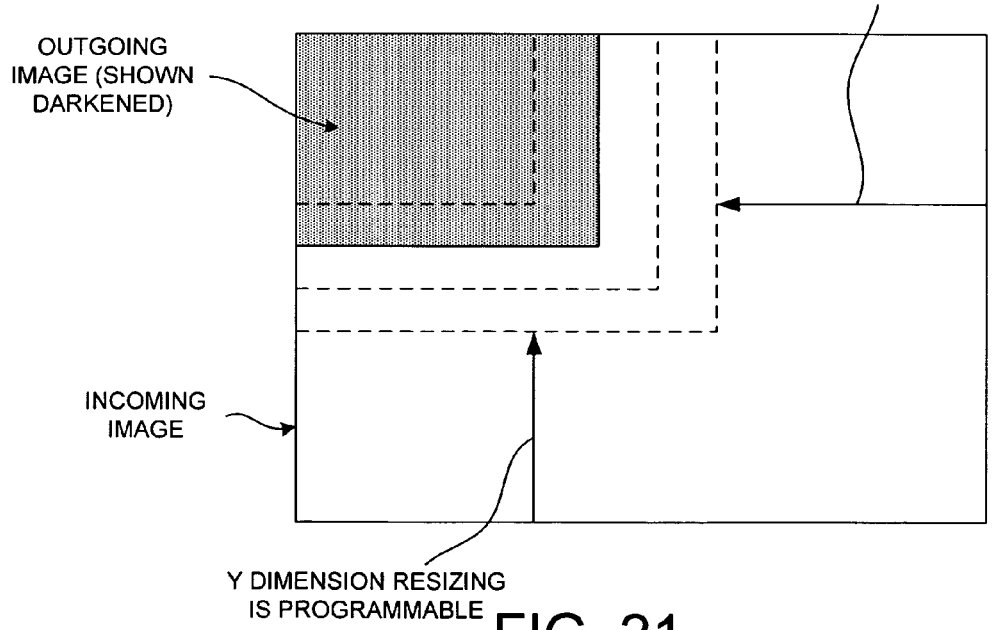
FIG. 20
FIG. 21

HORIZONTAL
MAGNIFICATION EXAMPLE

HORIZONTAL
MAGNIFICATION EXAMPLE

CONTINUOUS BURST MODE DIGITAL CAMERA

CROSS-REFERENCE TO RELATED APPLICATION

This application claims the benefit under 35 U.S.C. §119 of Provisional Application No. 60/566,545, entitled "Continuous Burst Mode Digital Camera", filed Apr. 28, 2004 (the subject matter of which is incorporated herein by reference).

TECHNICAL FIELD

The present invention relates to digital cameras, and more particularly to a digital camera having a continuous high-resolution burst mode capability.

BACKGROUND

FIG. 1 (Prior Art) is a simplified diagram of a conventional consumer market high-resolution digital still camera 1. Conventional consumer market digital cameras have several different architectures, but the architecture illustrated in FIG. 1 is a representative one. In addition to other parts of camera 1 that are not shown here, camera 1 includes a charge coupled device (CCD) image sensor 2, an image processing integrated circuit 3, a random access memory (RAM) buffer 4, and an amount of nonvolatile storage 5. Image processing integrated circuit 3 includes a digital signal processor (DSP) 6 and a JPEG compression engine 7. Nonvolatile storage 5 may, for example, be flash memory that is part of the camera, may be flash memory that is removable from the camera, or may be a combination of the two. Nonvolatile storage 5 may also be another type of nonvolatile storage such as, for example, a miniature hard disk. RAM buffer 4 may, for example, be an SDRAM (synchronous dynamic random access memory).

A significant selling feature of consumer market digital still cameras is the resolution of the pictures the camera takes. The camera may, for example, be advertised to have a five megapixel resolution. In addition to resolution, it is a significant selling feature for a current consumer market digital still camera to be able to take a burst of still images at the camera's highest resolution. In one example, the user presses down the shutter button on the camera and holds it down, thereby putting the camera into a burst mode. The camera then captures a sequence of high resolution images. In the present example, each image is a five megapixel picture. An image is captured by CCD image sensor 2, and is transferred pixel by pixel in the form of Bayer data from image sensor 2 and through a part of integrated circuit 3 and is stored into RAM buffer 4. This is illustrated by arrow 12.

Once the image is present in RAM buffer 4, the image data is read back out of RAM buffer 4 and is processed by DSP image processor 6. One task typically performed by DSP processor 6 is the conversion of the image data from Bayer format to another format (for example, RGB or YUV). Other tasks such as gamma correction are also typically performed. The DSP processor 6 may also provide the ability to magnify a part of the image. This is often called a zoom function. Other image processing functions are also typically performed.

After the image is image processed by DSP processor 6, processed image information passes to JPEG compression engine 7. JPEG compression engine 7 compresses the image information so that the image can be stored in a fewer number of bits. The resulting compressed image is then written into nonvolatile storage 5 in the form of a JPEG file. The flow of image data from RAM buffer 4 through image processing and JPEG compression and into nonvolatile storage 5 is illustrated by arrow 13.

The throughput in frames per second that DSP processor 6 and JPEG compression engine 7 can process is less than the maximum frame capture rate of image sensor 2. Because images of Bayer data are output from image sensor 2 at the maximum frame capture rate, Bayer data accumulates in RAM buffer 4. The amount of Bayer data in RAM buffer 4 increases as the capturing of images in burst mode continues. Depending on the amount of RAM buffer 4 provided on the camera, RAM buffer 4 eventually becomes full. In the present example of a conventional consumer market camera, RAM buffer 4 holds a maximum of five full resolution images in Bayer format, where each five megapixel Bayer image consumes approximately ten megabytes of RAM space (because each pixel is stored in a sixteen-bit location).

Once RAM buffer 4 is full, subsequent images cannot be stored into RAM buffer 4. DSP image processor 6 and JPEG compression engine 7 must first do enough processing to free enough memory space in RAM buffer 4 to accommodate the storage of another image of Bayer data. In the conventional camera 1 of FIG. 1, this takes about two seconds.

FIG. 2 (Prior Art) is a simplified time line that illustrates this burst mode operation. The user presses the shutter button at time 8. Five images are captured in rapid succession 9 until RAM buffer 4 becomes full at time 10. There is then a two second delay 11 in which images cannot be captured by camera 1. This is undesirable.

Consider the situation in which a user of camera 1 is a parent watching his or her child playing baseball. The child hits the ball and runs toward first base. The parent wishes to catch the whole experience in high resolution images, and then later to select a few of the most interesting images for display and long term use. The parent therefore presses the shutter button down and holds it, placing the camera in burst mode. The camera takes five high-resolution images in rapid succession as desired, but then stalls due to RAM buffer 4 being full of unprocessed Bayer data. At this time the child is declared safe at first, but the image of the moment at which the child was declared safe is not captured. The opportunity to take this image is forever lost. This is an undesirable aspect of conventional consumer market digital cameras. A solution is desired.

SUMMARY

A digital still camera has a continuous full-resolution burst mode wherein a rapid sequence of full-resolution images is captured, is image processed by a pipeline of dedicated hardware image processing engines, is optionally zoomed by a zoom engine, is compressed by a compression engine, and is stored into nonvolatile storage on the camera as a sequence of discrete files. The capturing of the full-resolution images and the storing of the discrete files continues at a rate of at least three frames per second until the user of the camera indicates continuous burst mode operation is to stop (for example, by releasing the shutter button) or until the amount of nonvolatile storage available becomes filled with discrete files. Although the camera has a RAM buffer memory into which raw or substantially raw sensor data is placed before it is image processed, the number of images that can be captured in a single burst is not limited by the size of the RAM buffer memory.

In one embodiment, the image sensor can capture and output a sequence of full-resolution five megapixel Bayer images at a maximum sustained full-resolution image frame capture and readout rate (MSFRIFCRR) of 3.75 frames per second. The image sensor in the actual camera outputs a sequence of full-resolution images at a frame rate equal to or substantially equal to this MSFRIFCRR. The image sensor in the camera described here outputs the sequence of full-resolution five megapixel Bayer images at a sustained frame rate of three frames per second. The pipeline of image processing engines, the zoom engine, and the compression engine process the output of the image sensor and write the resulting discrete files into nonvolatile storage at the same frame rate at which the image sensor outputs the raw image data. The discrete files are written into the nonvolatile storage at a rate of approximately three files per second. At the same time that the pipeline of image processing engines is performing image processing on an image frame, a reduced size version of the frame is generated and supplied to a display on the camera for real-time viewing. A second pass back through the pipeline of image processing engines is therefore not required to generate the reduced size image for viewing on the camera's display.

Because the pipeline of image processing engines, the zoom engine, and the compression engine process the output of the image sensor at the rate at which the image sensor outputs image data, image data does not accumulate in RAM buffer and the size of the RAM buffer does not limit the number of images that can be captured in a single burst. Burst mode operation is therefore said to be "continuous". In one embodiment, the amount of image information buffered in the RAM buffer does not change during the course of continuous burst mode operation by more than a couple of full-resolution images. Being able to provide a camera with continuous burst mode capability without having to provide a large RAM buffer allows the cost of a consumer market digital still camera having a continuous burst mode capability to be reduced. The architecture and pipelining techniques taught above enable a camera manufacturer to increase image processing throughput so that the camera manufacturer can take full advantage of the maximum capture and readout rate of state of the art image sensors used in commercial consumer market digital still cameras.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 18 illustrates how color correction is performed on an incoming RGB pixel.

FIG. 19 illustrates how an RGB pixel is converted into a YUV444 pixel.

FIG. 20 illustrates the CbCr clipping performed by engine 128 of FIG. 10.

FIG. 21 illustrates an operation of the backend resizer engine 137 of FIG. 10.

DETAILED DESCRIPTION

Reference will now be made in detail to some embodiments of the invention, examples of which are illustrated in the accompanying drawings.

Figure 3:
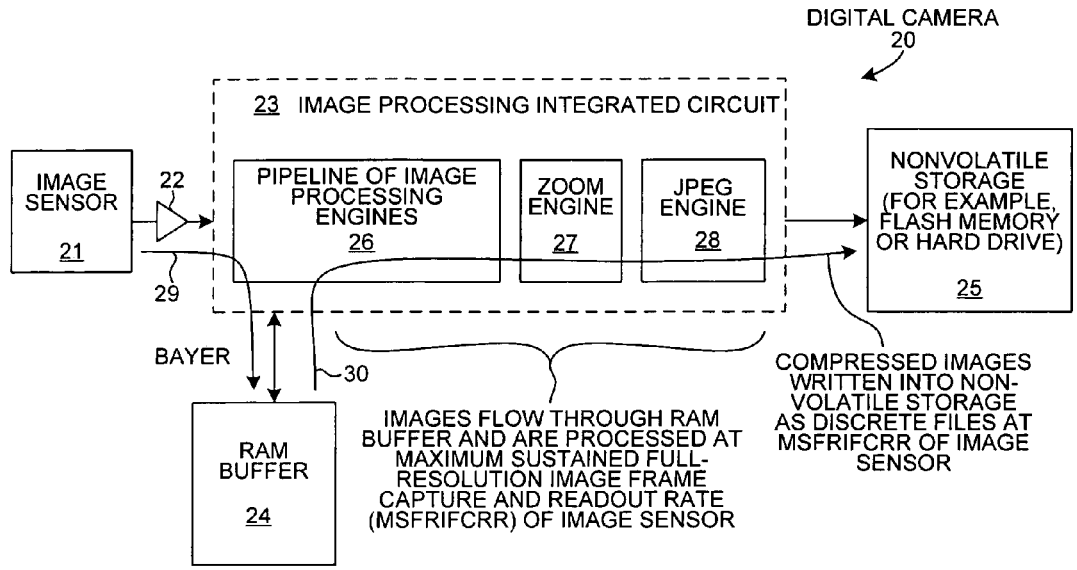
FIG. 3 is a simplified block diagram of a battery-powered handheld digital camera that is capable of continuous high-resolution burst mode operation in accordance with one embodiment of the present invention.

FIG. 3 is a simplified block diagram of a battery-powered handheld digital camera 20 in accordance with one embodiment of the present invention. Camera 20 includes a high resolution image sensor 21, and analog front end (AFE) integrated circuit 22, an image processing integrated circuit 23, a random access memory (RAM) buffer 24, and an amount of nonvolatile storage 25. Image processing integrated circuit 23 includes a pipeline of image processing engines portion 26, a zoom engine portion 27, and a JPEG compression engine portion 28.

Figure 4:
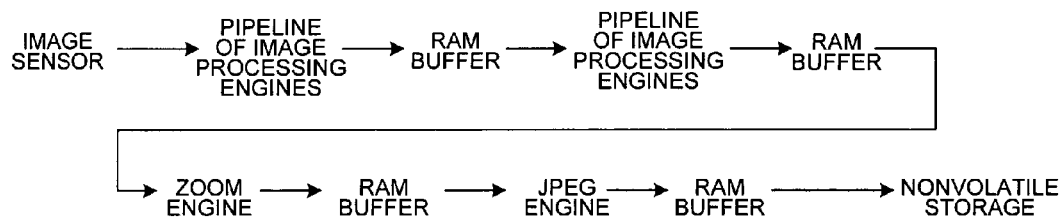
FIG. 4 illustrates the flow of image data through the camera of FIG. 3 from the image sensor to nonvolatile storage.

FIG. 4 illustrates the flow of image data from image sensor 21 to nonvolatile storage 25. Images are captured by image sensor 21, are digitized by AFE integrated circuit 22, and are written in Bayer format into RAM buffer 24. This flow is also illustrated in FIG. 3 by arrow 29. Next, image data passes from RAM buffer 24, through the pipeline of image processing engines portion 26, back into RAM buffer 24, then through zoom engine portion 27, then back into RAM buffer 24, then through JPEG engine portion 28, then back into RAM buffer 24, and then into nonvolatile storage 25. This flow is also illustrated in FIG. 3 by arrow 30.

Image sensor 21 can capture images and convert them into frames of full-resolution image data at a maximum sustained full-resolution image frame capture and readout rate (MS-FRIFCRR). This maximum capture frame rate is generally limited by the time required to expose the image sensor and the rate at which sensor data can be read out of the image sensor. In the present example, image sensor 21 is a CCD image sensor 21 and has a MSFRIFCRR rate of approximately 3.75 frames per second on a sustained and continuous basis when full-resolution images are captured and read out one by one as fast as possible. Approximately 260 milliseconds is required to read out one image (i.e., one frame) of raw sensor data. Each of these frames includes approximately five million sensor values.

In accordance with the present invention, camera 20 has a continuous burst mode. Camera 20 continuously captures images in image sensor 21 at a rate substantially equal to the MSFRIFCRR rate, image processes and zooms and compresses the images at the rate substantially equal to the MSFRIFCRR rate, and then writes the compressed images into nonvolatile storage 25 at the rate substantially equal to the MSFRIFCRR rate. Camera 20 sustains this operation as long as desired until nonvolatile storage 25 is filled or until the user wishes to halt the taking of burst mode pictures. In one embodiment, a link (for example, a wireless link or a serial bus link) is provided such that if nonvolatile storage 25 becomes filled, then subsequent compressed images of the burst that would otherwise be written into nonvolatile storage 25 are automatically communicated to a remote storage device that has additional storage capacity.

Figure 5:
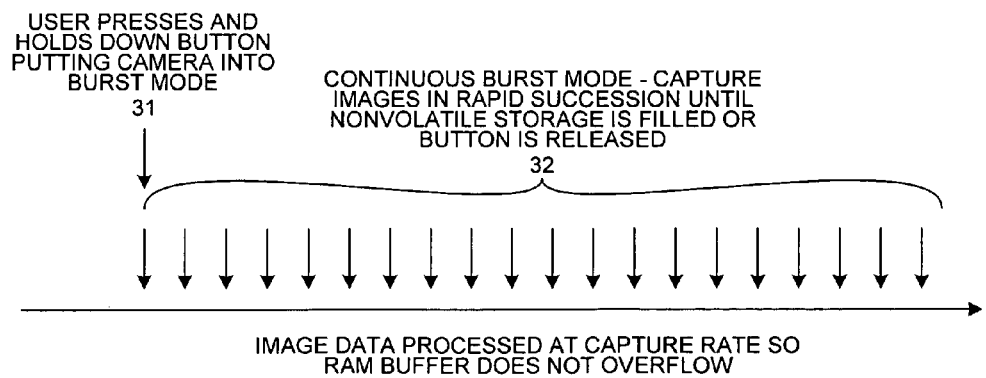
FIG. 5 is a simplified timeline illustrative of the continuous high-resolution burst mode operation of the camera of FIG. 3.

FIG. 5 is a simplified timeline illustrative of the continuous burst mode operation set forth above. In this example, the user presses the shutter button of the camera down and holds it down. Camera 20 detects this condition and enters the continuous burst mode. This occurs at time 31 in FIG. 5. Although the way continuous burst mode operation is initiated is described here as the pressing down and holding of the shutter button on the camera, it is understood that this is just an example. Other ways are possible. In some embodiments, for example, the user places the camera into burst mode, and then presses the shutter button to start the taking of a burst of images. The camera continues operation in burst mode until the next time the user presses the shutter button.

Once burst mode operation is initiated, camera 20 captures a sequence of images in image sensor 21 at the rate substantially equal to the MSFRIFCRR rate of the image sensor. Image sensor 21 outputs frames of sensor data and this data is digitized into a corresponding sequence of frames of Bayer values. Arrows 32 represent the continuous capturing of images and outputting of frames of Bayer values. Each frame of Bayer values is image processed, optionally zoomed, compressed and written into nonvolatile memory 25 in pipelined fashion at the rate substantially equal to the MSFRIFCRR of image sensor 21. Because image data flows into and out of RAM buffer 24 at the same average rate, RAM buffer 24 does not overflow and the capturing of burst mode images does not stall due to RAM buffer 24 being filled. In sustained continuous burst mode operation the amount of image information in RAM buffer 24 does not vary more than a couple of full-resolution images worth.

Figure 6:
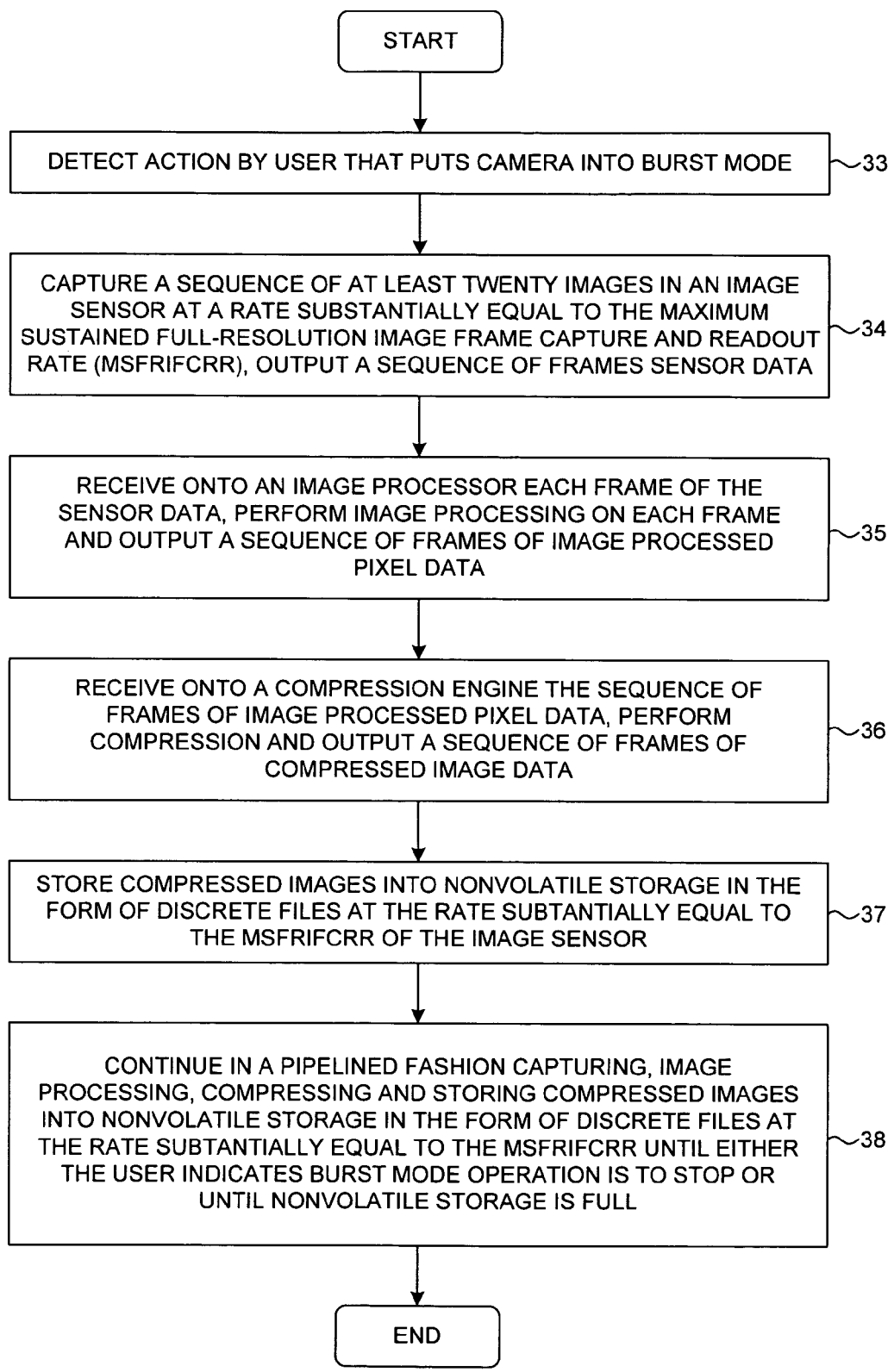
FIG. 6 is a flowchart of a method in accordance with one embodiment of the present invention.

FIG. 6 is a flowchart of a method in accordance with the present invention. The user performs an action to put the camera into burst mode (step 33). This action may, for example, be the pressing down and holding down of the shutter key. The camera detects the action and enters the burst mode. A sequence of images is captured by image sensor 21 (step 34) at the rate substantially equal to the MSFRIFCRR of image sensor 21. Image sensor 21 outputs a corresponding sequence of frames of sensor data. The frames of sensor data flow through AFE integrated circuit 22, are digitized, and are output as a sequence of frames of Bayer values. The sequence of frames of Bayer values passes through a portion of image processing integrated circuit 23, RAM buffer 24, and is received back onto image processing integrated circuit 23 for image processing. The frames of Bayer values flow into the pipeline of image processing engines 26, are image processed, and are returned to RAM buffer 24. The frames of image processed image data are read out of RAM buffer 24, flow through zoom engine 27, and are written back (step 35) into RAM buffer 24. The sequence of frames of image processed pixel data is read out of RAM buffer 24 and flows through JPEG compression engine 28. JPEG compression engine 28 compresses the sequence of frames of image processed pixel data and outputs (step 36) a corresponding sequence of frames of JPEG compressed image data. Each frame of compressed image data is stored into nonvolatile storage 25 in the form of a discrete JPEG file (step 37). These discrete files are stored into nonvolatile storage 25 at the rate substantially equal to the MSFRIFCRR of the image sensor. Camera operation continues in a pipelined fashion (step 38), capturing, image processing, compressing and storing compressed images into nonvolatile storage 25 until either: 1) the user performs an action indicating that the capturing of images is to stop (for example, by releasing the shutter button), or 2) nonvolatile storage 25 becomes filled with compressed image files.

Figure 7:
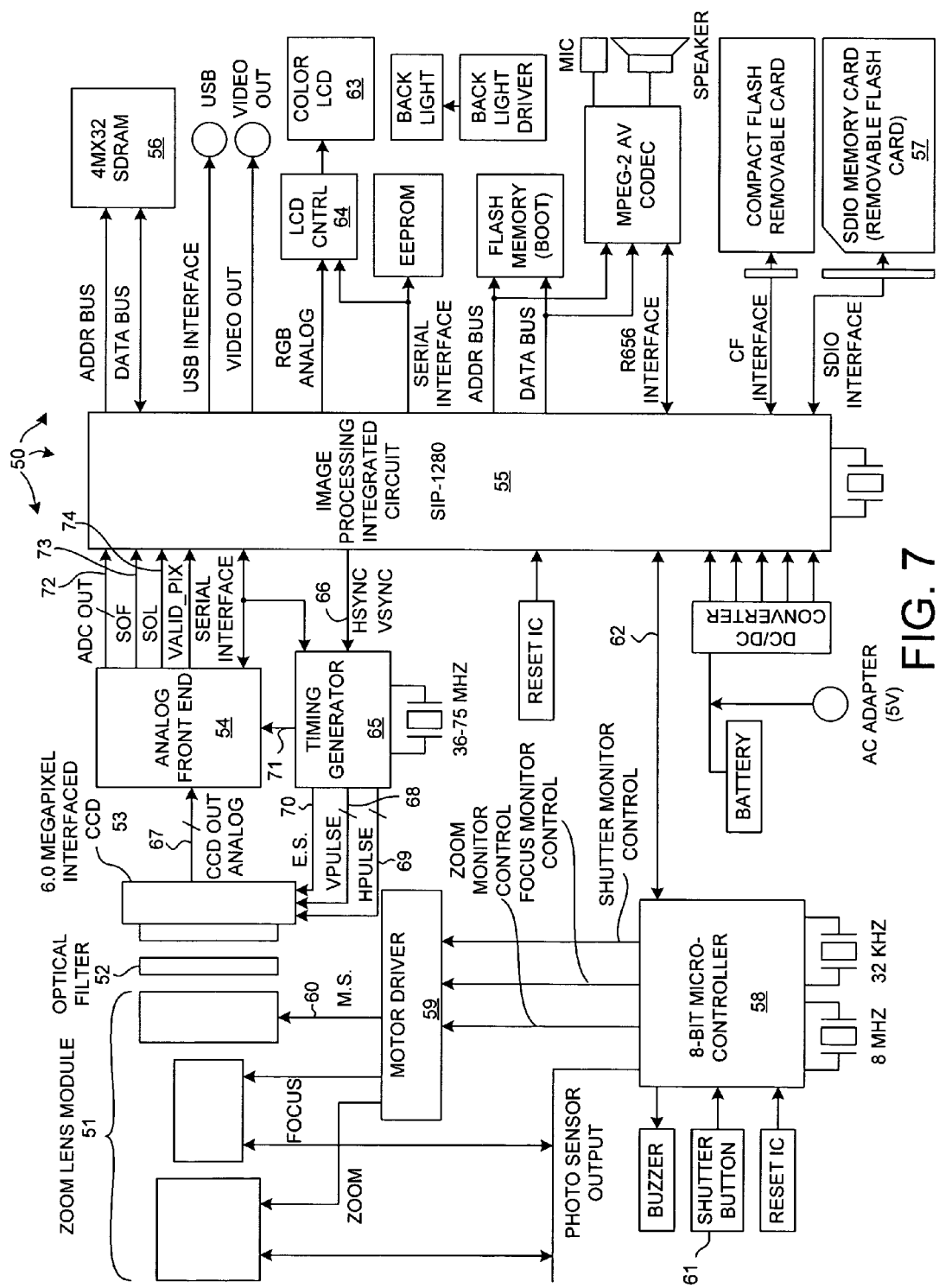
FIG. 7 is a simplified high level diagram of a second embodiment of a camera that is capable of continuous high-resolution burst mode operation. The camera is a battery-powered, consumer market, handheld, high-resolution (five megapixel) digital still camera.

A more detailed description of the operation of a specific embodiment of a digital camera in accordance with the present invention is set forth below in connection with FIGS. 7-25. FIG. 7 is a high level block diagram of the circuitry of a digital still camera 50. Camera 50 includes a zoom lens module 51, an optical filter 52, a six megapixel CCD image sensor 53, an analog front end (AFE) integrated circuit 54, an image processing integrated circuit 55, an SDRAM buffer memory integrated circuit 56, and a secure digital (SD) removable flash memory card 57. Zoom lens module 51 is controlled by a microcontroller 58 via a motor driver 59. A mechanical shutter signal (MS) 60 is supplied by motor driver 59 in this way.

Microcontroller 58 detects whether the various buttons on the camera, including shutter button 61, are pressed. Microcontroller 58 reports the status of the shutter button back to image processing integrated circuit 56 via lines 62. Camera 50 has a color LCD display 63 which is usable to view images about to be captured as well as to view images already captured. The image processing integrated circuit 55 controls LCD display 62 via an LCD controller circuitry 64. A timing generator 65 uses vertical and horizontal synchronization information received from image processing integrated circuit 55 via lines 66 to supply the necessary signals to image sensor 53 such that image sensor 53 outputs raw sensor data via lines 67 to AFE integrated circuit 54. Timing generator 65 supplies a vertical read out pulse signal VPULSE via line 68, a horizontal read out pulse signal HPULSE via line 69, and an electrical shutter signal via line 70.

Figure 8:
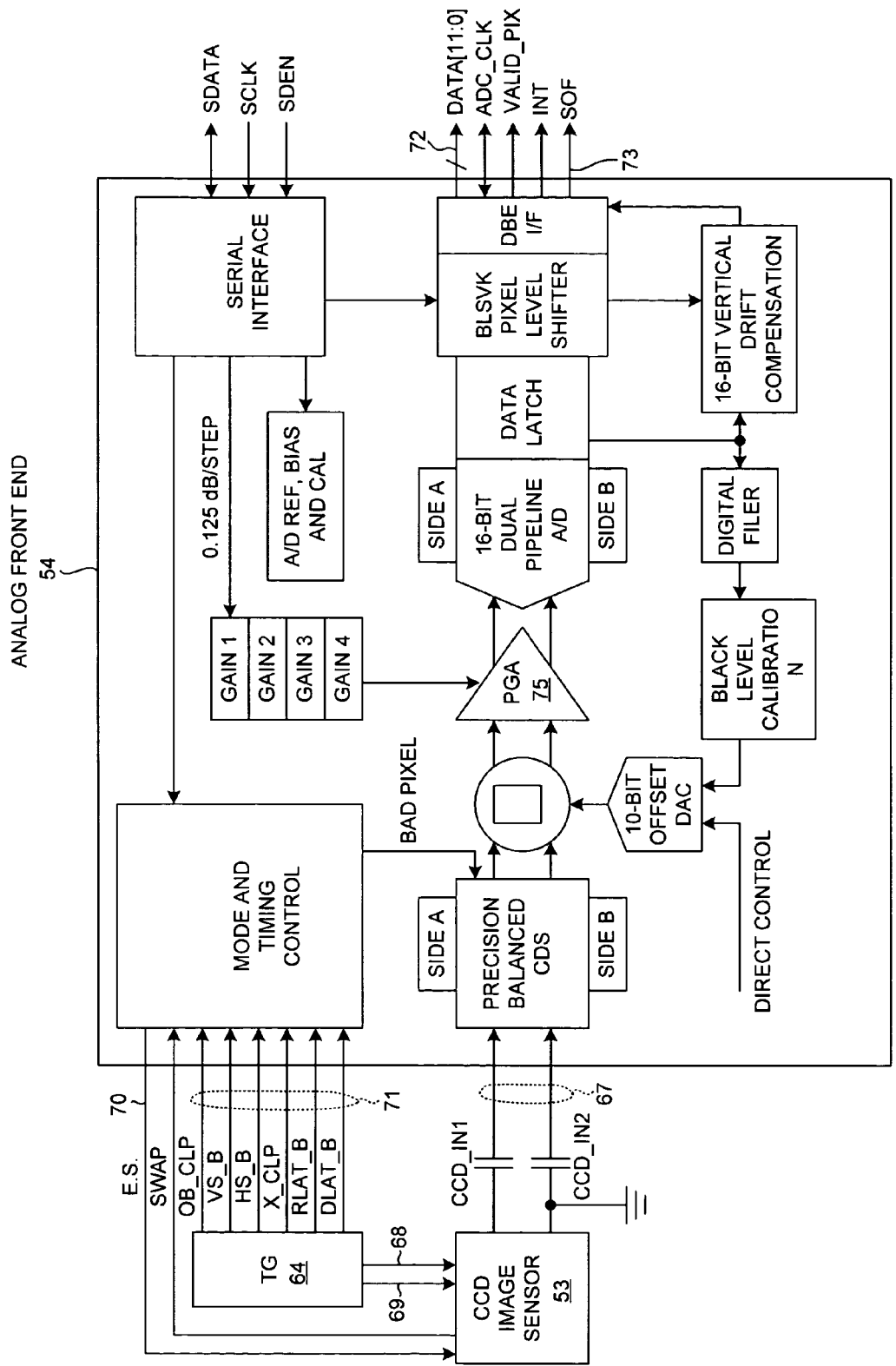
FIG. 8 is a simplified block diagram of the analog front end (AFE) integrated circuit of the camera of FIG. 7.

FIG. 8 is a more detailed block diagram of AFE integrated circuit 54 of FIG. 7. Timing generator 65 supplies synchronizing information over lines 71 to AFE integrated circuit 54 and supplies an electrical shutter signal (E.S.) to CCD image sensor 53 via line 70, differential vertical shift pulse signals VPULSE via lines 68, and horizontal shift pulse signals HPULSE via lines 69. CCD image sensor 53 outputs raw sensor data in analog form via lines 67 to AFE integrated circuit 54. AFE integrated circuit 54 digitizes the raw sensor data and supplies digitalized Bayer data via parallel bus 72 to image processing integrated circuit 55. AFE integrated circuit outputs a start of frame signal SOF on line 73 to indicate the start of a frame of pixel data. AFE integrated circuit 54 has a programmable gain amplifier 75 so that the output of different sensors on the image sensor can be amplified by one of a plurality of programmable gains.

Figure 9:
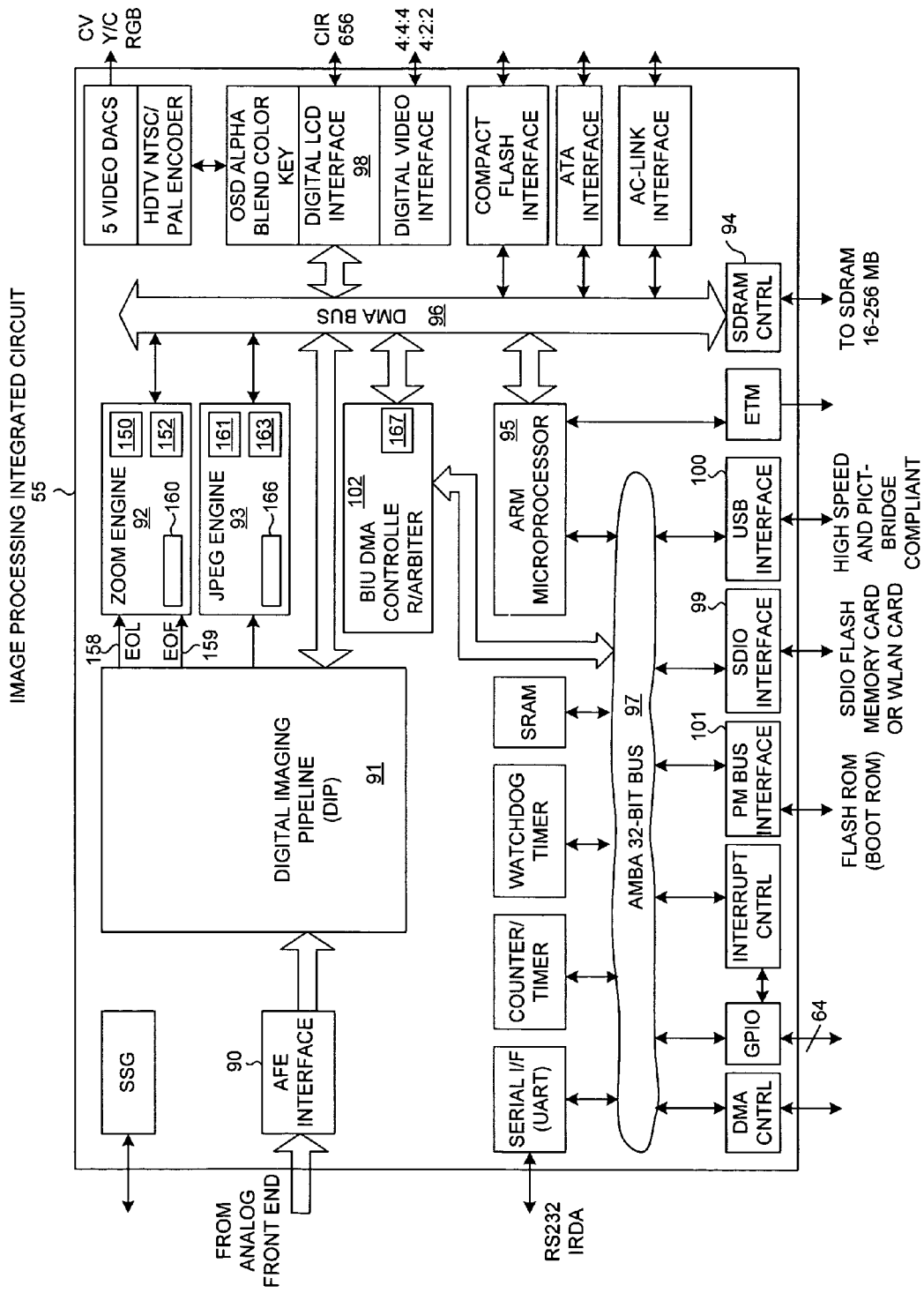
FIG. 9 is a simplified block diagram of the image processing integrated circuit of the camera of FIG. 7.

FIG. 9 is a high level block diagram of image processing integrated circuit 55. Among other parts, image processing integrated circuit 55 includes AFE interface circuitry 90, a digital imaging pipeline (DIP) 91, a zoom engine 92, a JPEG compression engine 93, an SDRAM controller 94, an ARM processor 95, a direct memory access (DMA) bus 96, and a second bus 97, a digital LCD interface 98, an SDIO interface 99, a USB bus interface 100, a PB bus interface 101, and a DMA controller/arbiter 102. ARM processor 95 boots from FLASH ROM via the PB bus interface 101. ARM processor 95 then executes code from either FLASH ROM or SDRAM 56. SDRAM 56 (see FIG. 7) is accessed via SDRAM controller 94. Control of the circuitry coupled to the second bus 97 (for example, SDIO interface 99, USB bus interface 100, and PM bus interface 101) is via memory mapped control registers.

Digitized Bayer sensor data from AFE integrated circuit 54 enters image processing integrated circuit 55 from the left via AFE interface 90, and then passes through the digital imaging pipeline (DIP) 91. The image processing of DIP 91 is performed by a chain of dedicated hardware engines that operate in pipelined fashion. Additional details on DIP 91 and how its various dedicated hardware engines perform image processing is explained in further detail below.

DIP 91 outputs frames of image processed pixel data. These frames pass over DMA bus 96 and SDRAM controller 94 and are stored in SDRAM 56 (see FIG. 7). The frames of image processed pixel data are read back out of SDRAM 56 and are processed by zoom engine 92. Zoom engine 92 may, for example, magnify a certain portion of a frame. The resulting image processed pixel data passes over DMA bus 96 and SDRAM controller 94 and is stored in SDRAM 56 (see FIG. 7). The frames of image processed pixel data are read out of SDRAM 56 and pass through SDRAM controller 94 and DMA bus 96 to JPEG compression engine 93. Each frame of image processed pixel data is compressed, and is written back out to SDRAM 56 via DMA bus 96 and SDRAM controller 94. The resulting compressed frames of compressed pixel data are read back out of SDRAM 56 and are transferred by DMA controller 102 through SDIO interface 99 and into FLASH memory. Each compressed frame is stored in FLASH memory as a discrete JPEG file. At the same time that a compressed full resolution JPEG file is being written into FLASH memory via SDIO interface 99, a smaller version of the same image is optionally supplied via digital LCD interface 98 so that a small version of the image is displayed on the small LCD display of the camera.

Figure 10A:
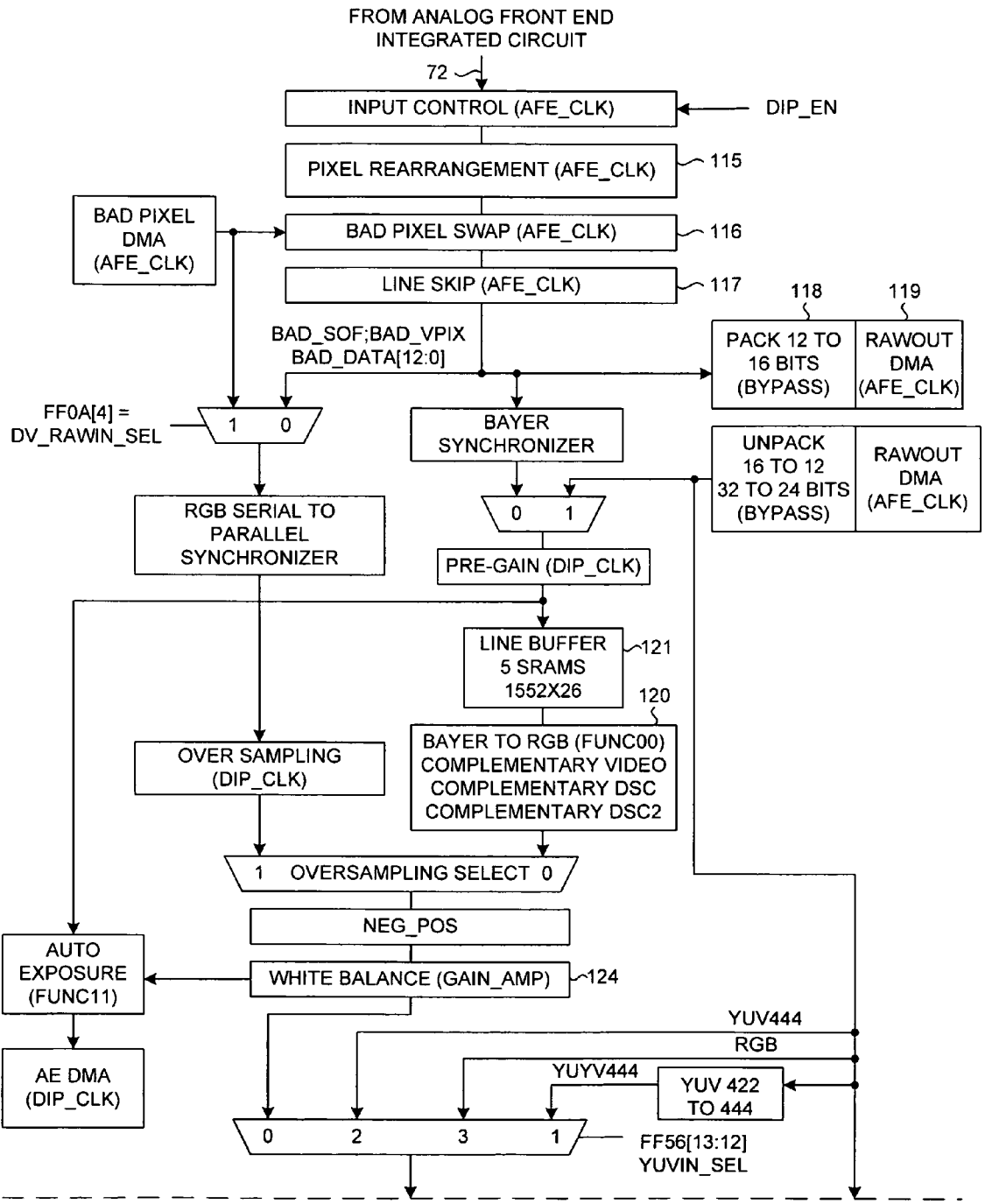
FIG. 10 is a more detailed block diagram of the circuitry within the digital imaging pipeline (DIP) of the image processing integrated circuit of FIG. 9.
Figure 10B:
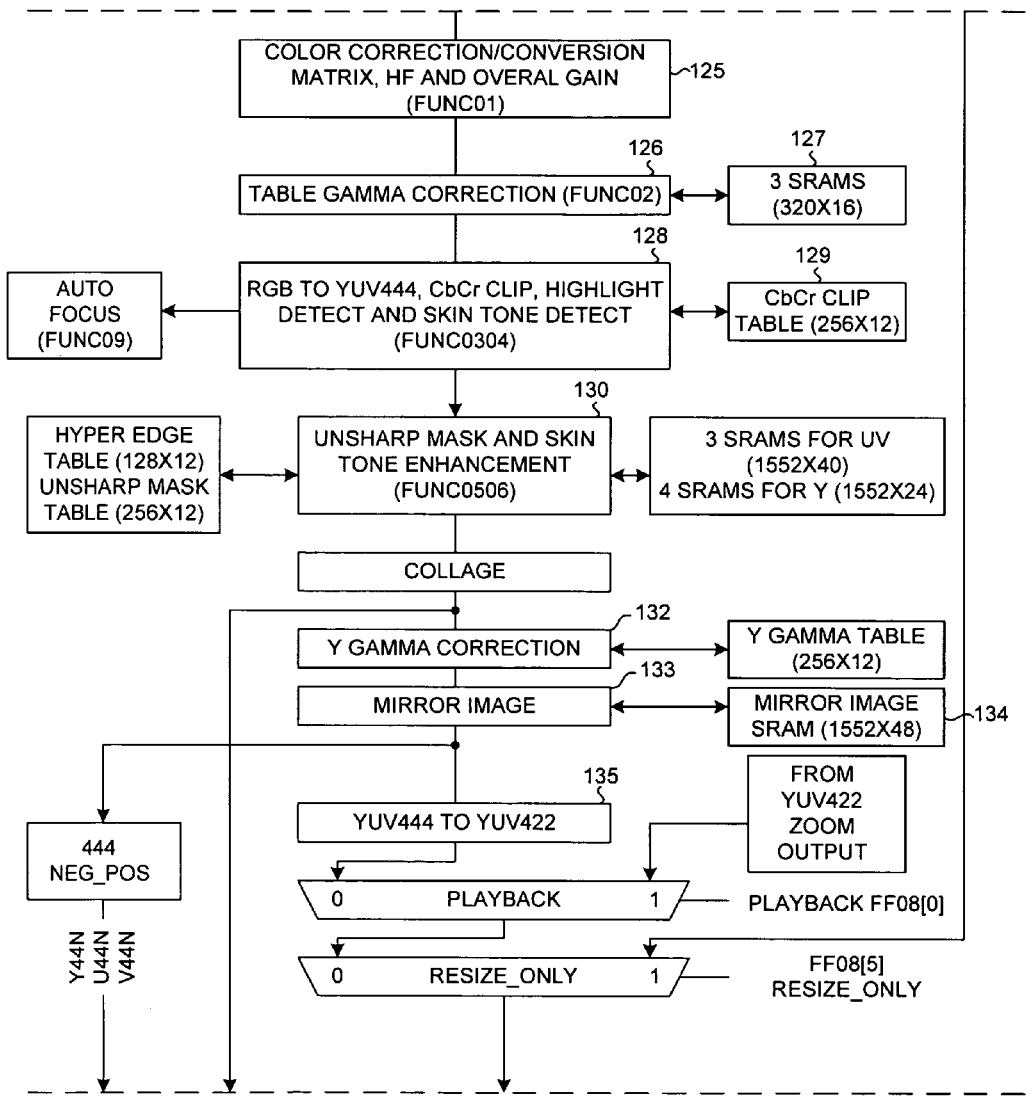
Figure 10C:
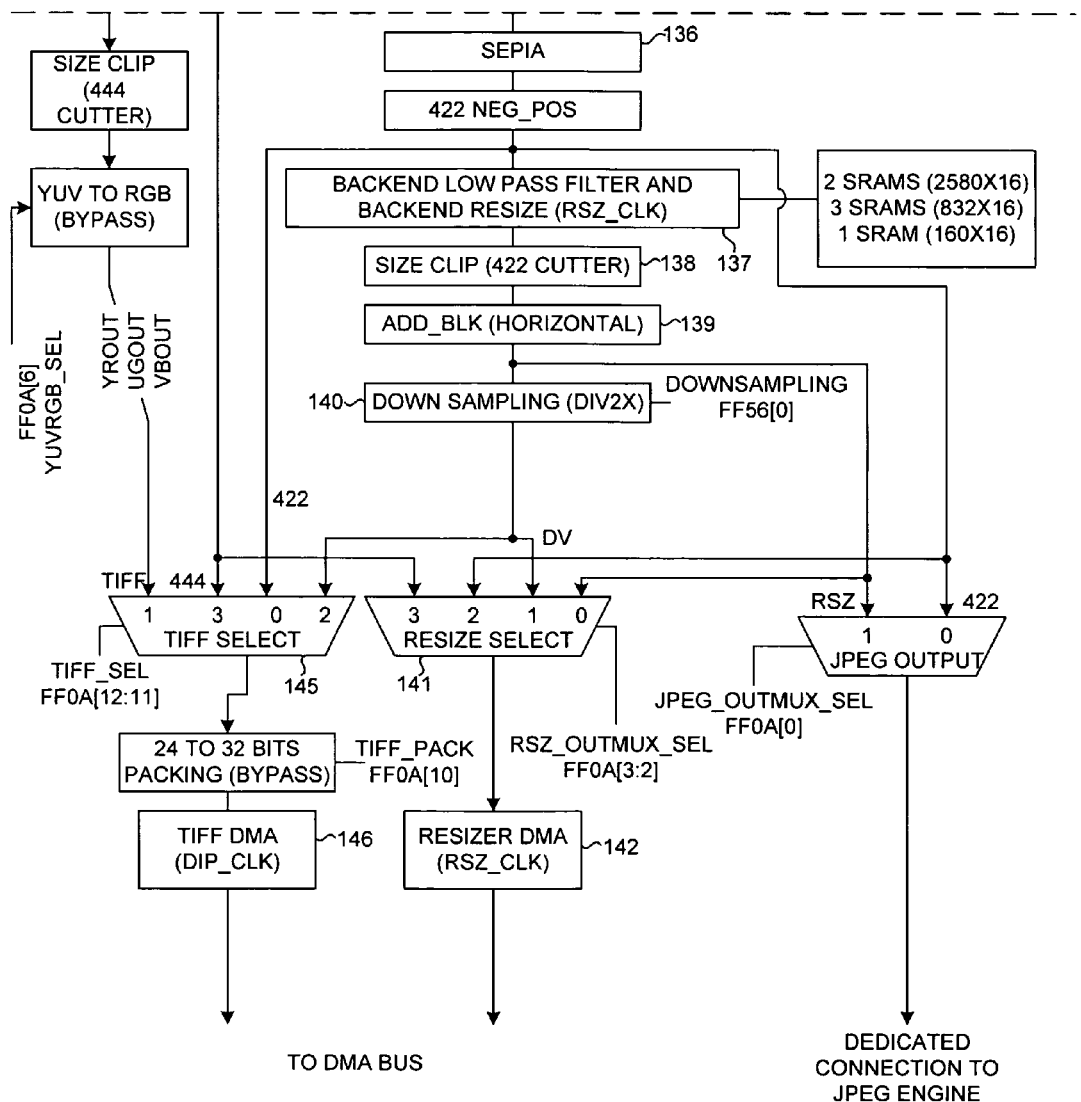

FIG. 10 is a more detailed block diagram of the circuitry within digital imaging pipeline (DIP) 91 of FIG. 9. Frames of Bayer sensor data are received from CCD image sensor 53 via AFE interface 90 and parallel data bus 69, one pixel at a time, row by row.

Figure 12:
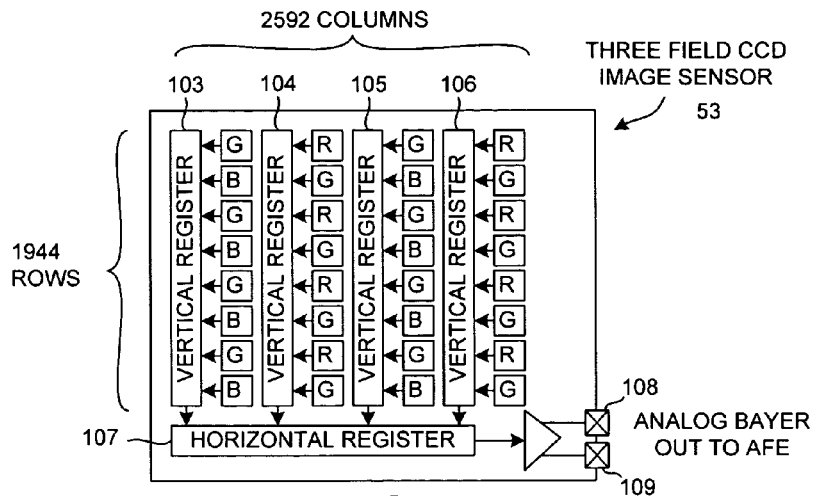
FIG. 12 is a simplified diagram of the image sensor of the camera of FIG. 7.

FIG. 12 is a simplified diagram that illustrates the readout of Bayer sensor data values from CCD image sensor 53. CCD image sensor 53 has rows and columns of sensors. There are approximately 2592 sensors in each row. There are approximately 1944 rows. Each sensor has a corresponding register bit. The register bits of a column of sensors form a sort of vertical bucket brigade shift register for the transfer of charge. There are four vertical shift registers 103-106 illustrated in FIG. 12. The charge amounts shifted out of these vertical shift registers provide parallel load data inputs for a horizontal shift register 107. After an exposure period, a charge is stored in each sensor. The charge is indicative of an intensity of light received onto the sensor. The charges of the sensors are read out of the CCD image sensor by first supplying a vertical shift pulse VPULSE. VPULSE causes the charges of the sensors of each row to be shifted down one row. The charges on the sensors in the bottom row are parallel loaded into horizontal shift register 107. A series of horizontal shift pulses HPULSE is then supplied to the CCD image sensor to cause the charges in the bottom shift register to be shifted out to the right. After amplification, the sensor data is output onto differential output terminals 108 and 109. It takes time after each shift for the voltage on the output terminals 108 and 109 to settle to their final values. Once the voltage on the output terminals has stabilized, then the voltage can be digitized into a twelve-bit Bayer sensor value by AFE integrated circuit 54.

CCD image sensor 53 does not output its sensor data row by row sequentially, but rather outputs the sensor data from a first field of the rows of sensors (rows 1, 4, 7 and so forth) first. A blanking period follows the output of each row of the first field. When all the rows of the first field have been output, then the sensor data from a second field of the sensor rows (rows 2, 5, 8 and so forth) are output. A blanking period follows the output of each row of the second field. When all the rows of the second field have been output, then the sensor data from a third field of the sensor rows (rows 3, 6, 9 and so forth) are output. Again, a blanking period follows the output of each row of the third field.

Figure 13:
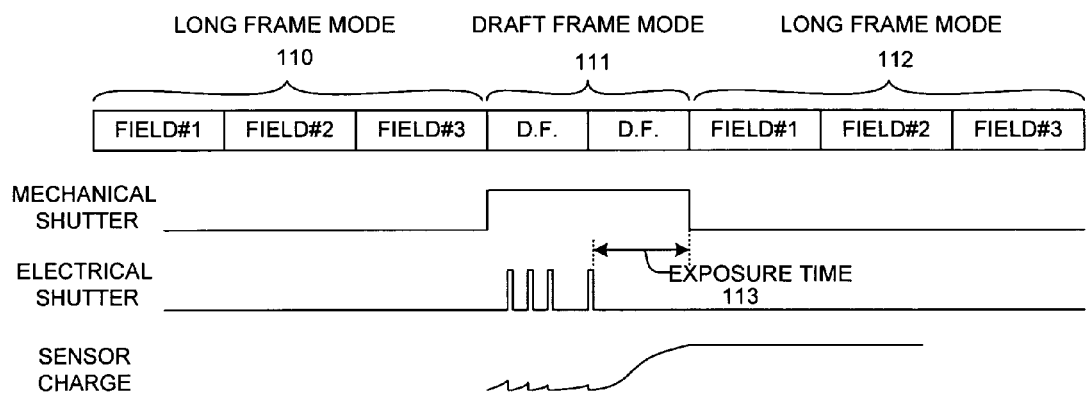
FIG. 13 is a waveform diagram that illustrates how the electrical and mechanical shutter signals define the exposure period of the image sensor of FIG. 12.

FIG. 13 is a waveform diagram that illustrates the exposure period. CCD image sensor 53 has a short frame (called draft frame) mode and a longer frame mode. A first image of sensor values is shown being read out in the longer frame mode for duration 110. The CCD image sensor 53 then captures a second image in the second of two frames of the shorter frame mode during duration 111. The second image of sensor values is then read out in the longer frame mode for duration 112. The waveform MECHANICAL SHUTTER illustrates the signal that controls the mechanical shutter. The shutter is open when the signal is high. The waveform labeled ELECTRICAL SHUTTER indicates the signal supplied to the CCD image sensor chip. First, the sensors of the CCD image sensor 53 are reset several times by the pulses of the electrical shutter signal. The time between the last electrical shutter pulse and the falling edge of the mechanical shutter signal is the exposure time 113. Charge on a sensor within CCD image sensor 53 is illustrated in the bottom waveform labeled SENSOR CHARGE. After the falling edge of mechanical shutter signal, the charge values captured by the sensors of the CCD image sensor 53 are shifted out of the CCD image sensor 53 using the vertical and horizontal shift pulses as set forth above. After the sensor data of a sensor is output onto the output terminals 108 and 109 of the CCD image sensor 53 and is allowed to stabilize, then the voltage is digitized by AFE integrated circuit 54 into a Bayer twelve-bit value.

Figure 14:
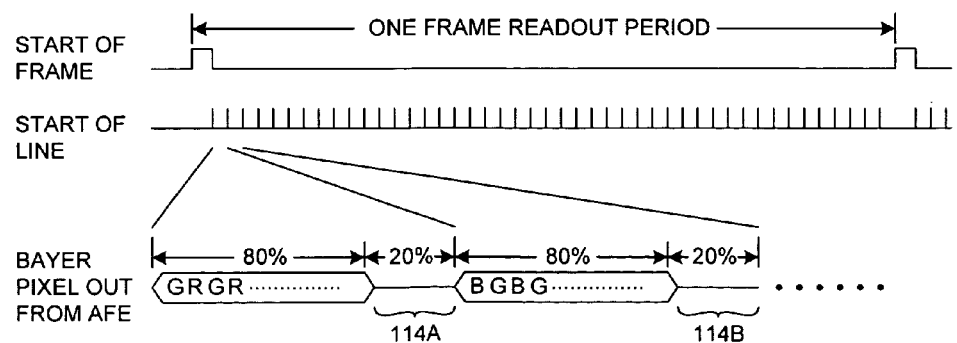
FIG. 14 is a simplified waveform diagram that illustrates the transfer of one frame of digitized image data from the AFE to the image processing integrated circuit.

FIG. 14 illustrates the output of one frame of Bayer sensor values from AFE integrated circuit 54. AFE 54 outputs a start of frame (SOF) signal to image processing integrated circuit 55 to indicate the start of a frame of Bayer values. The Bayer values are output from AFE 54 in the same three fields that image data was received by AFE 54 from CCD image sensor

53. As illustrated by the bottom waveform of FIG. 13, the Bayer data values of row one of field one are read out as a sequence of Bayer values GRGRGRGR. After the Bayer values of this row are output, a blanking period 114A occurs. Blanking period 114A is approximately twenty percent of the total line read out time. The Bayer values for the next row of the field (in this case, row 4) are then output. In the present example, these values are output as a sequence of Bayer values BGBGBGBG. After the Bayer values of this row are output, another blanking period 114B occurs. This process is repeated for each row of field one, and then for each row of field two, and then for each row of field three. In this fashion, Bayer values are supplied to image processing integrated circuit 55.

CCD image sensor 53, in the present example, requires a minimum of 40 nanoseconds to output a sensor value. It also takes a minimum of two short frame periods for CCD image sensor 53 to be reset and to expose the sensors properly to capture an image. The short frame (sometimes called a draft frame) period is thirty milliseconds minimum. A blanking period of 15.2 microseconds minimum follows the readout of each row of sensor values. Because there are approximately 1944 rows of approximately 2592 sensors each, the MSFRIFCRR rate is approximately 3.75 full-resolution frames per second. In the present example, frames of sensor values are output from CCD image sensor 53 and are digitized by AFE 54 into frames of Bayer values and are supplied to image processing integrated circuit 55 at a rate substantially equal to this MSFRIFCRR rate. This rate is approximately three frames per second.

Returning to FIG. 10, a frame of Bayer pixel data is supplied via bus 72, pixel by pixel, row by row, field by field, to a pixel rearrangement engine 115.

The image processing integrated circuit 55 is a versatile device capable of being used with any one of multiple different image sensors. Some of these image sensors output Bayer values in an order other than the order set forth in connection with FIGS. 12-14. Some image sensors, for example, output Bayer values of two rows intermixed in a single incoming Bayer value pixel stream.

Figure 15A:
FIGS. 15A, 15B and 15C illustrate different pixel readout patterns.
Figure 15B:
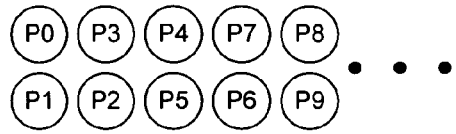
Figure 15C:
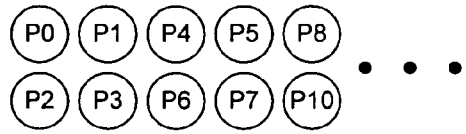

FIG. 15A illustrates the stream of incoming Bayer values. The corresponding locations of the sensors from which the Bayer values originated may be as illustrated in FIG. 15B, or as illustrated in FIG. 15C. Pixel rearrangement engine is configured by ARM processor 95 so that it reorders the Bayer values received so that the output Bayer values flow out of rearrangement engine 115 in the order set forth above in connection with FIGS. 12-14. In the present example, Bayer data is output from the image sensor in the order of FIGS. 12-14, so pixel arrangement engine 115 is controlled to perform no rearrangement. Because only two rows of Bayer values are needed to output a reordered pair of rows of Bayer data, there is at most a two-row delay between the Bayer values entering pixel rearrangement engine 115 and the Bayer values output from rearrangement engine 115.

The flow of Bayer values then flows through a bad pixel swap engine 116. An image sensor may have certain disfunctional sensors. The image sensor may, nonetheless, be used in a digital camera. The manufacturer of the image sensor typically informs the camera manufacturer of the locations of the bad pixels, and this information is loaded into and stored on the camera. Bad pixel swap engine 116 has access to the information on which sensor locations are defective. Bad pixel swap engine 116 monitors the flow of Bayer values and when a Bayer value from one of these disfunctional sensors is present, interpolates a replacement value. In one example, the Bayer value in the same row as the bad pixel that borders the bad sensor on the left is averaged with the Bayer value in the same row as the bad pixel that borders the bad pixel on the right. Bad pixel swap engine 116 replaces the value output by the disfunctional sensor with the calculated average. Because the bad pixel swap engine 116 only uses two neighboring pixels in the same row as the Bayer value being considered, the bad pixel swap engine 116 outputs Bayer values with only a few value delay with respect to the Bayer values streaming into the engine.

Figure 11:
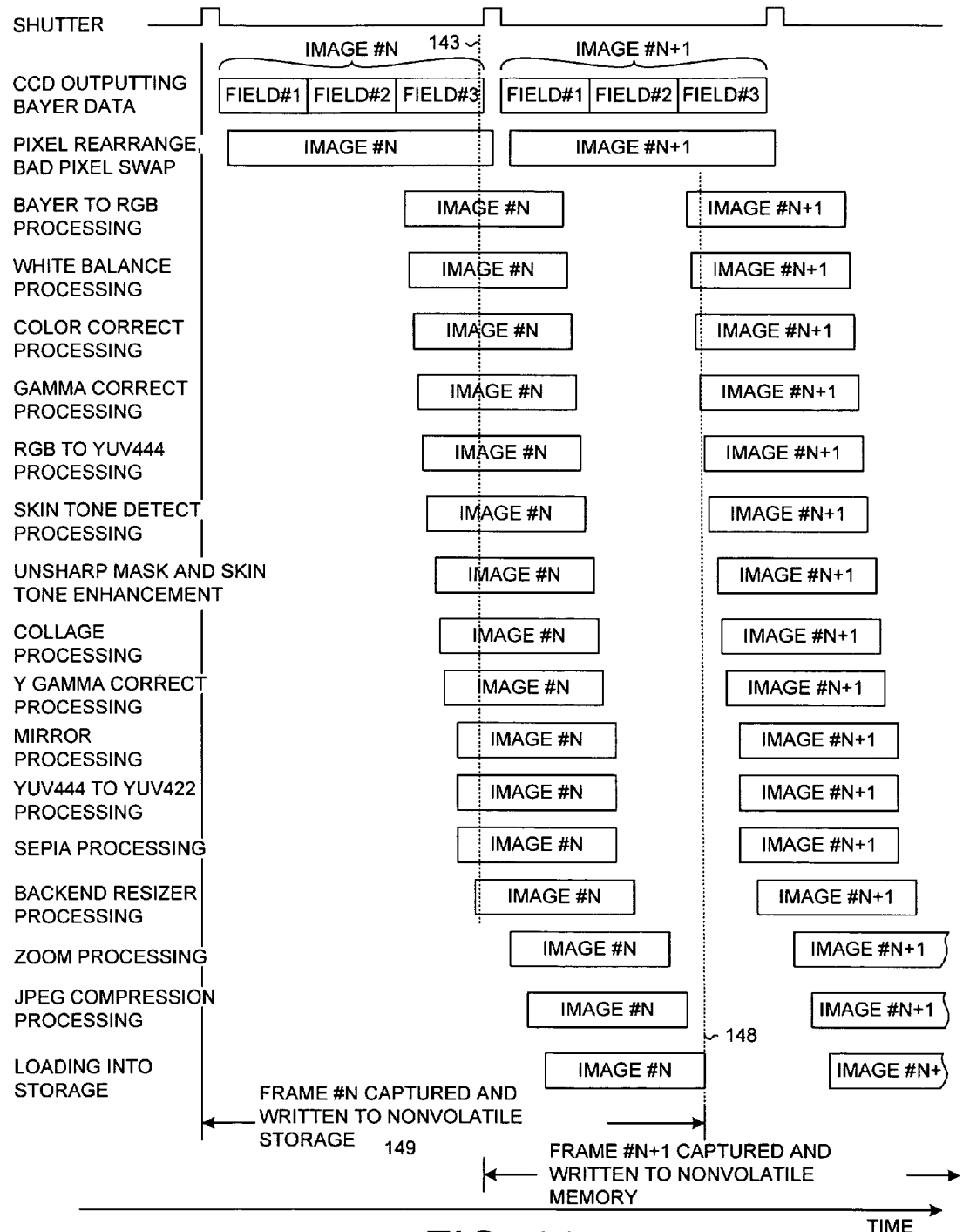
FIG. 11 is a timeline that illustrates the pipelined operation of the various parts of the camera of FIG. 7.

FIG. 11 illustrates this pipelined operation. Bayer values of the three fields are shown being received onto the image processing integrated circuit 55 in the upper row designated "CCD OUTPUTTING BAYER DATA". The processing of the pixel rearrangement engine 115 and the bad pixel swap engine 116 is illustrated by the block in the second row designed "PIXEL REARRANGE BAD PIXEL SWAP". Note that the operation is pipelined in that the engines 115 and 116 begin outputting Bayer values within approximately two rows of pixels of the start of the flow of Bayer values flowing into the image processing integrated circuit 55. Note also that engines 115 and 116 complete their processing within approximately a two-row of Bayer value delay with respect to the time that the last row of the frame entered the image processing integrated circuit 55.

Returning to FIG. 10, the flow of Bayer values passes through blocks 117, 118 and 119, across bus 96 (see FIG. 9), and into SDRAM 56 (see FIG. 7) via SDRAM controller 94. Returning to FIG. 11, this process of writing Bayer values into SDRAM 56 continues to the right in FIG. 11 until field #1 of the frame #N is in SDRAM 56 and then continues until field #2 of the frame #N is in SDRAM 56. The rows of Bayer data are written into SDRAM such that if all three fields of Bayer data were present in SDRAM at the same time, then the Bayer data would appear as a block of deinterlaced Bayer data.

ARM processor 95 monitors the flow of information into SDRAM 56 so that it knows when the beginning of the third field is being written into SDRAM 56. ARM processor 95 then uses BIU DMA controller/arbiter 102 to begin reading the Bayer data back out of SDRAM 56.

Figure 16:
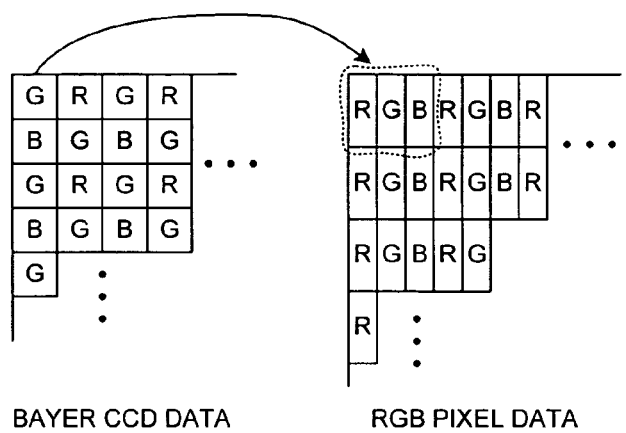
FIG. 16 illustrates the conversion of Bayer sensor data values into RGB pixel values.

Next, a conversion from Bayer format to RGB (Red Green Blue) format is performed by a Bayer-to-RGB conversion engine 120. For each Bayer value, one R sixteen-bit value is generated, one G sixteen-bit value is generated, and one B sixteen-bit value is generated. The three RGB values are referred to as a single pixel. This conversion is illustrated in FIG. 16.

Figure 17:
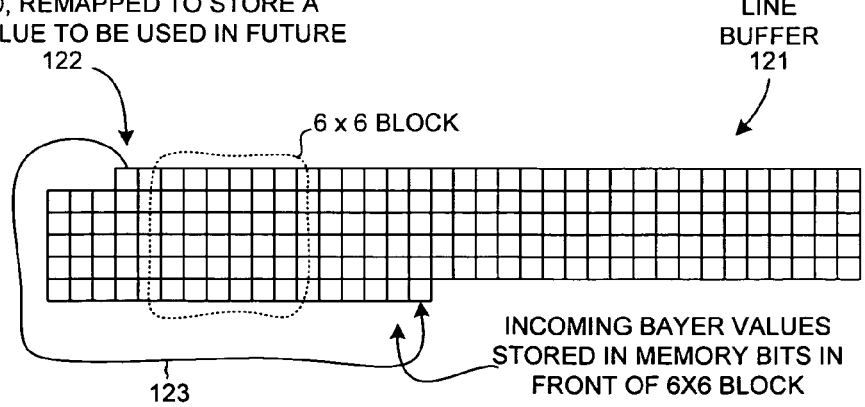
FIG. 17 illustrates how a six-by-six block of Bayer values is used to generate a set of RGB pixel values.

FIG. 17 shows how a six-by-six block of Bayer values is used to generate each set of three RGB values. After the R, G and B values are generated, then the six-by-six block of Bayer values is shifted one column of Bayer values to the right, and the next set of three R, G and B values is generated. This process is repeated all the way across the rows of Bayer values. When the six-by-six block reaches the right edge of the rows, then the six-by-six block is shifted down one row and moved back to the left edge of the rows and the process repeats. As illustrated in FIG. 17, the Bayer-to-RGB conversion process therefore requires access to prior rows of Bayer data. Accordingly, prior rows of Bayer values are buffered in a line buffer 121 (see FIG. 10) and Bayer to RBG engine 120 operates on the Bayer values in this buffer 121 to output RGB pixel values. As each set of three RGB pixel values is generated and the six-by-six block is shifted to the right, one Bayer value will no longer be needed in the process. This Bayer value is identified with reference numeral 122 in FIG. 17. The memory bit of the line buffer 121 that was storing this Bayer value is therefore remapped to store a Bayer value to be received by the line buffer 121 in the future. This remapping is illustrated by arrow 123 in FIG. 17. Bayer values flowing into line buffer 121 are therefore written into these remapped memory bits in front of the moving six-by-six block.

Due to the operation of line buffer 121 and the six-by-six block of prior Bayer values used to calculate a set of RGB pixel values, there is approximately a six row delay between the Bayer values supplied to Bayer-to-RGB conversion block 120 and the RGB values being output from Bayer-to-RGB conversion block 120. Because the Bayer-to-RGB conversion uses a six-by-six block of Bayer values, Bayer values from two rows of field#3 are present in each six-by-six block. The Bayer-to-RGB conversion process therefore does not start until the necessary field#3 Bayer values are present in line buffer 121, and this occurs approximately two Bayer row delays after field#3 Bayer values begin to flow out of SDRAM 56. This delay between Bayer values being output from pixel rearrangement and bad pixel swap blocks 115 and 116 and RGB pixels being output from Bayer-to-RGB conversion block 120 is represented in the time line of FIG. 11 by the degree to which the block labeled IMAGE #N in the "BAYER-TO-RGB PROCESSING" row is shifted to the right in time with respect to the block labeled IMAGE #N in the "PIXEL REARRANGE, BAD PIXEL SWAP" row. Note that the left edge of the IMAGE #N block in the "BAYER-TO-RGB PROCESSING" row starts about two row delays to the right of the beginning of the time that field#3 starts to be output from the CCD image sensor. Once the Bayer-to-RGB conversion starts, it keeps pace with the flow of Bayer values flowing out of the CCD image sensor.

Returning to the block diagram of FIG. 10, the flow of sixteen-bit RGB pixel values proceeds to white balance engine 124. Parts of an image that should appear as white may actually be rendered with a slight tinge of color. For example, white may appear with a slight pinkish tinge. White balance engine 124 can be configured by ARM processor 95 to remove this tinge. In one example, the use of white balance on images taken is determined by user of the camera making a selection on the camera. If the white balance selection is made, then white balance engine 124 multiplies all red pixel values by a first predetermined value, multiplies all green pixel values by a second predetermined value, and multiplies all blue pixel values by a third predetermined value. The predetermined values are preset and remain constant from captured image to captured image. The predetermined values are selected to remove the undesired pinkish tinge so that areas of images that should appear as white do not have the pinkish tinge. Because the white balance engine 124 uses only one incoming pixel value and from that outputs a white balanced pixel value, there is only a one pixel delay going through white balance engine 124. This very slight delay is illustrated in the time line of FIG. 11 in that the block labeled IMAGE #N in the "WHITE BALANCE PROCESSING" row is only very slightly shifted to the right in time with respect to the block above it labeled IMAGE#N in the "BAYER-TO-RGB PROCESSING" row.

Returning to the block diagram of FIG. 10, the flow of sixteen-bit white-adjusted RGB pixel values proceeds to color correction engine 125. Color correction engine 125, for each incoming set of RGB pixel values, performs matrix multiplication with a programmable three-by-three matrix of numbers in accordance with the equation of FIG. 18, and outputs a corresponding outgoing set of sixteen-bit RGB pixel values. The values in the three-by-three matrix can be changed from frame to frame under the control of ARM processor 95. This operation is usable to rotate the color matrix in a desired fashion to eliminate color error. Because only one set of incoming RGB pixel values is needed to generate an outgoing color corrected set of RGB pixel values, there is only one pixel delay introduced in the flow of image information through the circuitry of FIG. 10. This very slight one pixel delay is illustrated in the time line of FIG. 11 in that the block labeled IMAGE #N in the "COLOR CORRECT PROCESSING" row is only very slightly shifted to the right in time with respect to the block above it labeled IMAGE#N in the "WHITE BALANCE PROCESSING" row.

Returning to the block diagram of FIG. 10, the flow of color-corrected sixteen-bit RGB pixel values proceeds to gamma correction engine 126. A particular display might have a rendered brightness versus pixel number value relationship for each of R, G and B. The relationship might not be linear. A red pixel number that is twice as big as another red pixel number may, for example, not be rendered on the display with twice the intensity of red. To correct for such non-linearities in a display device, the inverse function is applied to the pixel data so that the desired final luminosity will be displayed on the display device being used. Accordingly, there is one gamma correction table for red, one for green, and one for blue. These tables are stored in memories 127. In each table, a multiplication factor is stored for each of 320 incoming pixel ranges. An incoming sixteen-bit RGB pixel value is checked with the appropriate table to determine into which range the incoming RGB pixel value is found. The red gamma correction table is, for example, consulted when the incoming pixel value is a red pixel value. When the range is found, then the multiplication factor found in the table that is associated with the range is retrieved and is multiplied by the incoming pixel value to generate a gamma corrected output pixel value. The resulting gamma corrected output pixel values are each truncated to be ten-bit values and are output from gamma correction engine 126.

Because the gamma correction operation involves multiplication with fixed predetermined numbers, the buffering of previous RGB pixel data is not required to generate a gamma corrected RGB pixel value. A delay of a relatively small number of clocks (clocks that clock the image processing integrated circuit 55) is experienced from the time an RGB pixel value enters the gamma correction engine 126 and the time a corresponding gamma corrected RGB pixel exits the block. This slight delay is illustrated in FIG. 11 in that the block labeled IMAGE #N in the "GAMMA CORRECT PROCESSING" row is only very slightly shifted to the right in time with respect to the block above it labeled IMAGE #N in the "COLOR CORRECT PROCESSING" row.

Returning to the block diagram of FIG. 10, the flow of gamma-corrected ten-bit RGB pixel values proceeds to RGB-to-YUV444 conversion engine 128. FIG. 19 illustrates how a set of three ten-bit RGB pixel values is converted using a three-by-three matrix of numbers into a corresponding set of three ten-bit YUV444 pixel values. The numbers in the matrix are programmable under the control of ARM processor 95. The delay associated with RGB to YUV444 engine 128 is illustrated in FIG. 11 in that the block labeled IMAGE #N in the "RGB TO YUV444 PROCESSING" row is only very slightly shifted to the right in time with respect to the block above it labeled IMAGE #N in the "GAMMA CORRECT PROCESSING" row.

For each set of YUV444 pixel values, there is a one-bit skin tone detect flag and a one-bit high chroma flag. The skin tone detect is determined, on a pixel by pixel basis, whether the color of the pixel falls within a skin tone range of colors. There is a Y minimum value and Y maximum value that defines a range of Y for human skin, a Cb minimum value and a Cb maximum value that defines a range of Cb for human skin, and a Cr minimum value and a Cr maximum value that defines a range of Cr for human skin. There is also a clustering parameter that sets a threshold of a number of neighboring pixels that must meet the range requirements in order for any of them to be flagged as skin tone pixels. If the YUV444 pixel is determined to fall within the ranges specified for human skin and to meet the clustering requirement set, then the associated skin tone detect flag is set, otherwise it is cleared. The minimum and maximum values that set the ranges as well as the clustering requirement can be changed under the control of ARM processor 95. For each incoming YUV444 pixel there is one outgoing skin tone detect flag bit output, but there is a delay of several YUV444 pixels between the time an YUV444 is received by the skin tone detect functionality and the time that the associated skin tone detect flag bit is output.

Chroma clipping is supported using a programmable clip table. Chroma clipping can be used to control Cr and Cb levels to reduce the color noise in a dark area of an image, or to control Cr and Cb saturation in a high light area. FIG. 20 illustrates a chroma-clipping table, the defining parameters for which are stored in block 129. ARM processor 95 can change these table defining parameters on a frame to frame basis in order to accommodate different lighting conditions. By operation of the table of FIG. 20, high input values of Y are clipped down to the predefined clip level so that output Y values have a maximum of the clip level value. Individual YUV444 pixels are applied to the chroma clipping table, so the chroma clipping operation introduces only a slight delay. The delay associated with skin tone detection and chroma clipping operations is illustrated in FIG. 11 in that the block labeled IMAGE #N in the "SKIN TONE DETECT PROCESSING" row is only very slightly shifted to the right in time with respect to the block above it labeled IMAGE #N in the "RGB TO YUV444 PROCESSING" row.

Returning to the block diagram of FIG. 10, the flow of YUV444 pixel data proceeds to unsharp mask and skin tone enhancement engine 130. Unsharp mask is a procedure for detecting edges in an edge enhancement operation. The pixel values are coming in YUVYUVYUV. The Y values are put in a separate four line buffer, and the U and V values are put into a three line buffer. A five-by-five matrix of Y values is needed, so a four line buffer for Y is used, and a three line buffer for U and V is used. After looking for sharp discontinuities, the processing of UV is started after receiving three lines of UV.

At the same time that unsharp mask is operating on the pixels in the five-by-five block, a skin tone enhancement is performed. If the skin tone flag bits for enough pixels in the five-by-five block are set, then the entire block is determined to be pixels that should be representing skin. If a pixel within the five-by-five block has a color outside the skin tone detect parameters, then this pixel may represent a blemish in the skin. The color of the pixel is changed to make it blend with its neighboring skin tone pixels, thereby removing the skin blemish. The same four row buffer used in the unsharp mask function is therefore used in the skin tone enhancement engine 130. The four row delay associated with the unsharp mask and skin tone enhancement engine 130 is illustrated in FIG. 11.

After passing through a collage function engine, the YUV444 pixel data flows through Y gamma correction engine 132. This engine 132 applies gamma correction to the Y, U and V values. A Y correction table, a V correction table, and a U correction table are stored in engine 133. Each incoming ten-bit Y, U or V value falls within one of 320 ranges of its corresponding table. For each range, the table stores a multiplication value. The multiplication value retrieved from the table is multiplied by the incoming ten-bit value to generate an output value. The Y, U and V output values from engine 132 are truncated to eight bits. The Y, U and V tables can be changed under the control of ARM processor 95. Only one pixel delay is associated with Y gamma correction engine 132. This delay is illustrated in FIG. 11 in that the block labeled IMAGE #N in the "Y GAMMA CORRECT PROCESSING" row is only very slightly shifted to the right in time with respect to the block above it labeled IMAGE #N in the "COLLAGE PROCESSING" row.

Returning to the block diagram of FIG. 10, the flow of Y gamma corrected YUV444 pixels is supplied to mirror image engine 133. Mirror image engine 133 performs an optional horizontal mirror function and includes a buffer 134 for this purpose. Pixel values flow into buffer 134 in one order and are written into buffer from left to right, and are then read out of buffer 134 in the reverse order from right to left. This effectively performs a horizontal mirroring of the image. Accordingly, there is a one row delay associated with mirror image engine 133. The one row delay introduced by mirror image engine 133 is illustrated in FIG. 11 in that the block labeled IMAGE #N in the "MIRROR PROCESSING" row is shifted to the right in time by one row with respect to the block above it labeled IMAGE #N in the "Y GAMMA CORRECT PROCESSING" row.

Returning to the block diagram of FIG. 10, the flow of optionally mirrored YUV444 pixel values is supplied to YUV444 to YUV422 conversion engine 135. Each pair of neighboring YUV422 pixels in the horizontal dimension shares a common U value and a common V value. Accordingly, a pair of neighboring YUV422 pixels includes one eight-bit Y value for the first pixel, one eight-bit Y value for the second pixel, and one eight-bit U value for both pixels, and one eight-bit V value for both pixels. Engine 135 therefore uses a horizontal averaging filter that operates on neighboring pixels in the horizontal dimension to generate the shared eight-bit U and V values for the newly generated YUV422 pixels. Because only three incoming YUV444 pixels are needed to generate an output YUV422 pixels, the delay introduced by YUV444 to YUV422 conversion engine 135 is only three pixels. The delay is illustrated in FIG. 11 in that the block labeled IMAGE #N in the "YUV444 TO YUV422 PROCESSING" row is shifted to the right in time by three pixels with respect to the block above it labeled IMAGE #N in the "MIRROR PROCESSING" row.

Returning to the block diagram of FIG. 10, the flow of YUV422 pixel data is supplied to Sepia processing engine 136. Sepia engine 136 optionally changes the image from a color image to a monochromatic-type image with a yellow tinge to make the image appear, when rendered, as an aged black and white photograph. Sepia engine 136 replaces all U values in the frame with a common predetermined U value, and replaces all V values in the frame with a common predetermined V value. The Y luminance values are retained. This relatively simple replacement occurs on a pixel by pixel basis, and introduces little or no delay. The delay is illustrated in FIG. 11 in that the block labeled IMAGE #N in the "SEPIA PROCESSING" row is shifted to the right in time by only one pixel delay with respect to the block above it labeled IMAGE #N in the "YUV444 TO YUV422 PROCESSING" row.

Returning to the block diagram of FIG. 10, the flow of YUV422 pixel data is supplied to backend resizer engine 137. The backend resizer is a flexible image size reduction mechanism to satisfy a wide variety of needs by using a compound system that provides a reduction range from 1× to ⅟₃₂× in small steps. The backend resizer engine 137 is often used for low resolution playback, for real-time viewing of images and video on the camera's LCD, and for the viewing thumbnail images (for example, an image just captured or an image about to the captured) on the camera's LCD.

FIG. 21 is a diagram that illustrates operation of backend resizer engine 137. Resizing in the X dimension and the Y dimension are independently programmable. Interpolation is used to take the starting number of pixel values and to determine what the values of the pixels in the reduced size image ought to be if a subset of the pixels were used to render the image. Once the values for the pixels in the reduced size image are determined, the original pixel values are no longer needed. The resized pixel values are forwarded down through blocks 138-140 (see FIG. 10) and multiplexer 141 to a resizer DMA engine 142. The resizer DMA engine 142 writes the resized YUV422 pixel data out to DMA bus 96 (see FIG. 9) and via SDRAM controller 94 into SDRAM 56 (see FIG. 7). The delay due to the processing of backend resizer engine 137 is illustrated in FIG. 11 in that the block labeled IMAGE #N in the "BACKEND RESIZER PROCESSING" row is shifted to the right in time with respect to the block above it labeled IMAGE #N in the "SEPIA PROCESSING" row.

Figures 1, 2:
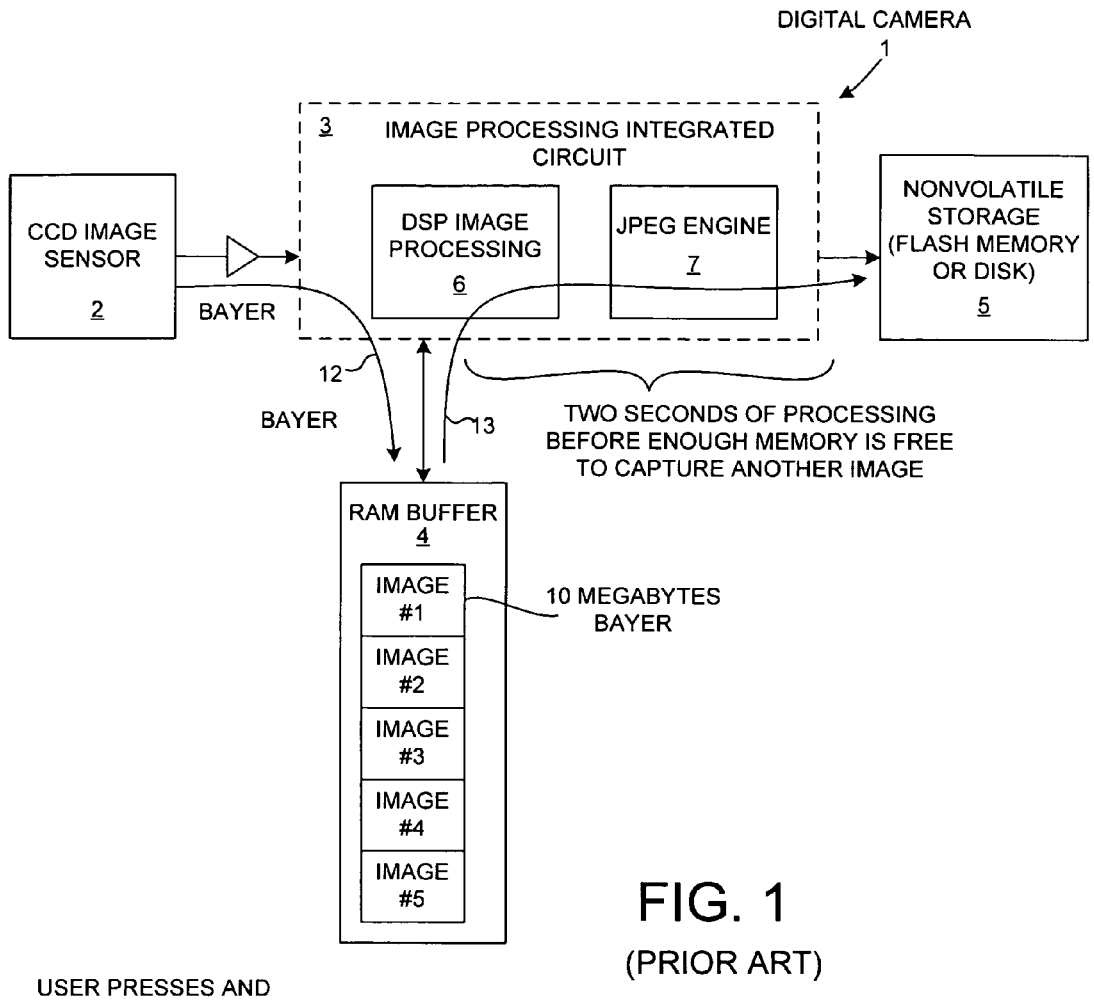
FIG. 1 (Prior Art) is a diagram of a conventional consumer market high-resolution digital still camera.
FIG. 2 (Prior Art) is a simplified time line that illustrates the burst mode operation of the conventional camera of FIG. 1.

In addition to the resized image being output from imaged processing integrated circuit 55 via resizer DMA engine 142, a full size YUV422 image can be output via multiplexer 145 and a TIFF DMA engine 146. The digital imaging pipeline 91 can therefore substantially simultaneously output a reduced size image via resizer DMA engine 142 for display on the LCD display 62 of the camera at the same time that the digital imaging pipeline 91 outputs a full size image via TIFF DMA engine 146 for JPEG compression and storage into DSIO memory card 57. In the DSP implementation of FIG. 1, on the other hand, the full size image is first stored, and then to view the image on the camera display a separate pass through of the backend resizer function is made to shrink the image for viewing on the camera LCD display.

As illustrated in FIG. 11, the processing performed by dedicated hardware engines 115, 116, 120, 124, 125, 126, 128, 130, 132, 133, 135, 136, and 137 is pipelined to such a degree that pixel information for IMAGE #N flows all the way through digital imaging pipeline 91 and is DMA transferred into SDRAM 56 while Bayer data values from field #3 of the same IMAGE #N are still being read out of CCD image sensor 53. This concurrence is represented in the time line of FIG. 11 by dashed line 143. Once set up by 95 ARM processor, each of the dedicated hardware image processing engines in DIP 91 starts by itself based on how much new image information it has received and does not require a start signal or command from ARM processor 95.

The camera's LCD display 62 has a resolution that is far lower than the full resolution of the image being captured. Zoom engine 92 allows a portion of an image to be expanded ("zoomed") so that detail that would otherwise not be seen on the smaller LCD display can be observed. This same feature allows high resolution details to be viewed on lower resolution displays external to the camera such as a low resolution computer screen.

Figure 22:
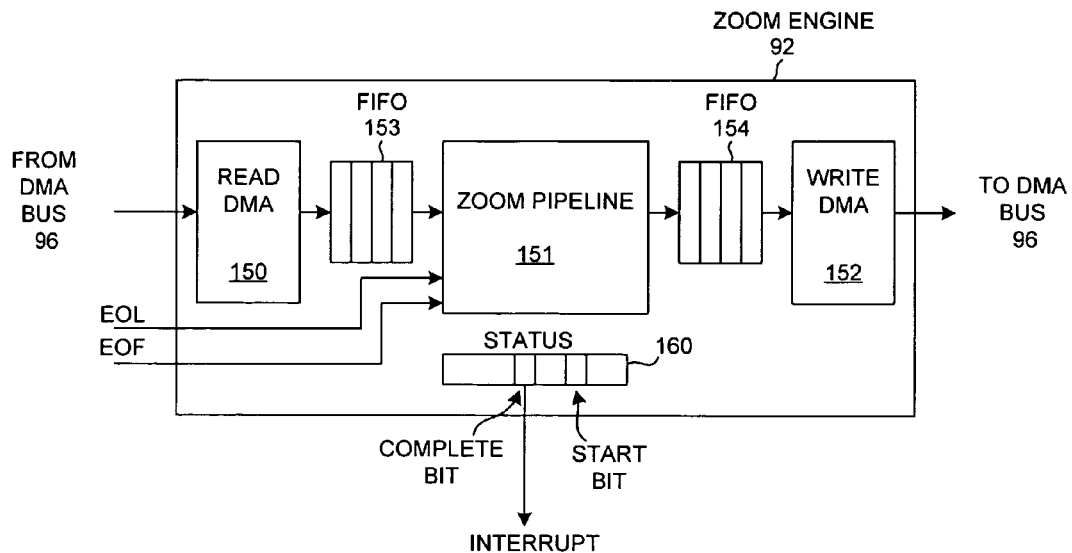
FIG. 22 is a simplified block diagram of zoom engine 92 of the camera of FIG. 7.

FIG. 22 is a block diagram of zoom engine 92. Zoom engine 92 includes a read DMA engine 150, a zoom pipeline 151, and a write DMA engine 152. Image information passing from the read DMA engine 150 to zoom pipeline 151 is buffered in FIFO 153. Similarly, image information passing from zoom pipeline 151 to write DMA engine 152 is buffered in FIFO 154.

Once the first rows of the image are stored in SDRAM 56, read DMA engine 150 reads the image information out of SDRAM 56, row by row. The image information is transferred across DMA bus 96 and into FIFO 153.

Figure 23:
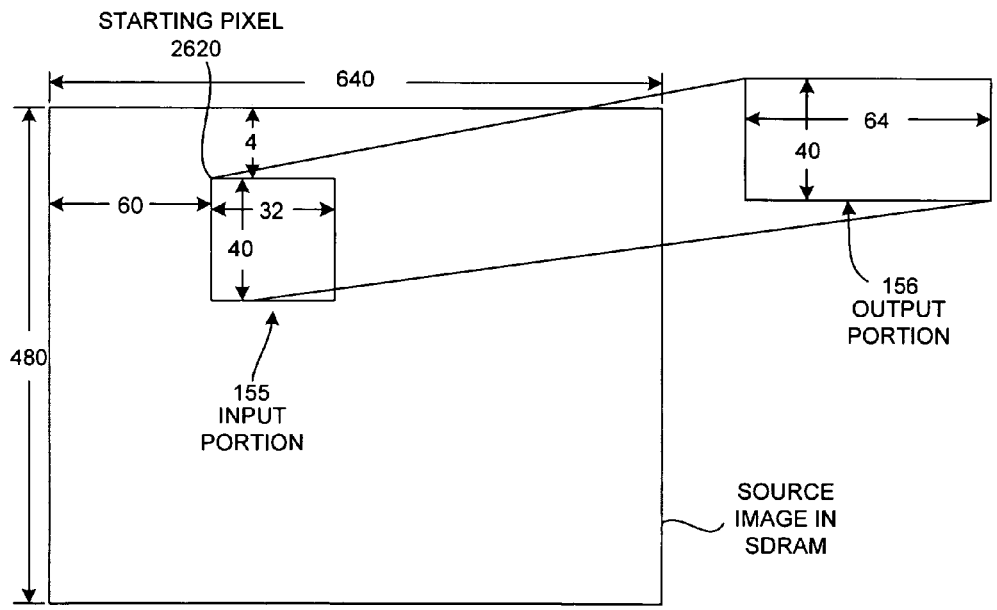
FIG. 23 illustrates a zoom operation performed by the zoom engine of FIG. 22.

FIG. 23 is a diagram of a zoom operation performed by zoom engine 92. In this example, an input portion 155 of the incoming image from SDRAM 56 is to be magnified in the horizontal dimension only with a 1:2 ratio into an output image portion 156. Input portion 155 starts at pixel number 2620. This pixel is four rows of 640 pixels each down, and starts 60 pixels into the fifth row. Input portion 155 is 32 pixels wide, and 40 pixels high. Output portion 156 is therefore 64 pixels wide and 40 pixels high.

Figure 24:
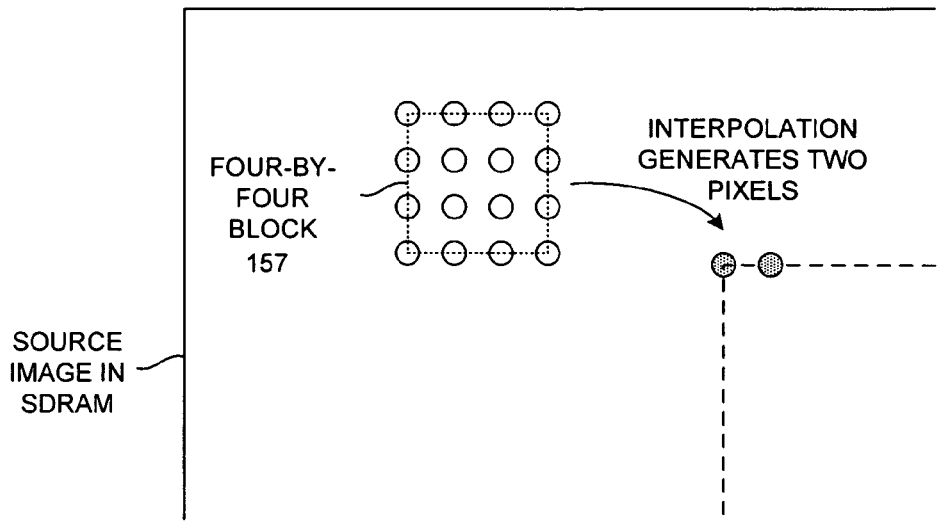
FIG. 24 illustrates how the zoom engine of FIG. 22 generates two zoom output pixels for each four-by-four block of pixels in input portion of the source image.

FIG. 24 is a diagram that illustrates how each pixel of the output portion 156 of FIG. 22 is generated. Zoom engine 92 performs bicubic interpolation on a four by four block 157 of pixels. Block 157 is slid from left to right across the rows of pixels of the input portion 155. When block 157 reaches the right edge of input portion 155, the block is moved down one row, and then proceeds left to right again. Because a one to two horizontal magnification is to be performed, two pixels are generated for each four by four block.

ARM processor 95 defines the size of the source image by writing a register in zoom engine 92 with the number of pixels in a row of the source image in SDRAM, and with the number of rows of the source image in SDRAM. ARM processor 95 also defines the input portion 155 to be zoomed by writing registers in zoom engine 92 with the starting pixel number in upper left corner of portion 155, how many pixels there are in each row of portion 155, and how many rows there are in portion 155. ARM processor 95 also writes the zoom factor (in this example, 2.0) into a register in zoom engine 92.

Read DMA engine 150 only transfers pixels within portion 155 from SDRAM 56 into zoom engine 92. Because zoom pipeline 151 operates on four by four blocks of pixels, zoom pipeline 151 can start outputting pixels after four rows of input portion 155 have been received into FIFO 153. Zoom pipeline 151 starts processing pixels after N rows of portion 155 are in FIFO 153, wherein N is at least four. Zoom engine 92 then remains approximately M rows of pixels behind the digital imaging pipeline 91. The numbers M and N are programmable under control of ARM processor 95.

So that zoom engine 92 can remain M rows behind DIP 91, DIP 91 outputs an end of line (EOL) pulse on EOL line 158 (see FIG. 9) to zoom engine 92. DIP 91 outputs a pulse on EOL line 158 after it outputs each row of pixels to SDRAM 56. Zoom engine 92 counts the pulses on end of line (EOL) line 158 and thereby keeps track of the current row being output by DIP 91. DIP 91 outputs an end of frame (EOF) pulse on EOF line 159 to denote the end of a frame. Once the ARM processor sets up the M and N numbers, the hardware of zoom engine 92 determines when to start zoom processing an when to suspend zoom processing. Typical values for M and N are six and ten.

Zoom pipeline 151 outputs pixels into FIFO buffer 154, and write DMA engine 152 transfers the zoomed pixel data from FIFO buffer 154 over DMA bus 96 into SDRAM 56. When zoom engine 92 has completed processing the current frame, zoom engine 92 sets a complete bit in its status register 160 and interrupts ARM processor 95. ARM processor 95 starts zoom engine 92 working on a frame by writing a start bit in status register 160. The delay due to the processing of zoom engine 92 is illustrated in FIG. 11 in that the block labeled IMAGE #N in the "ZOOM PROCESSING" row is shifted to the right in time six rows with respect to the block above it labeled IMAGE #N in the "BACKEND RESIZER PROCESSING" row.

Figure 25:
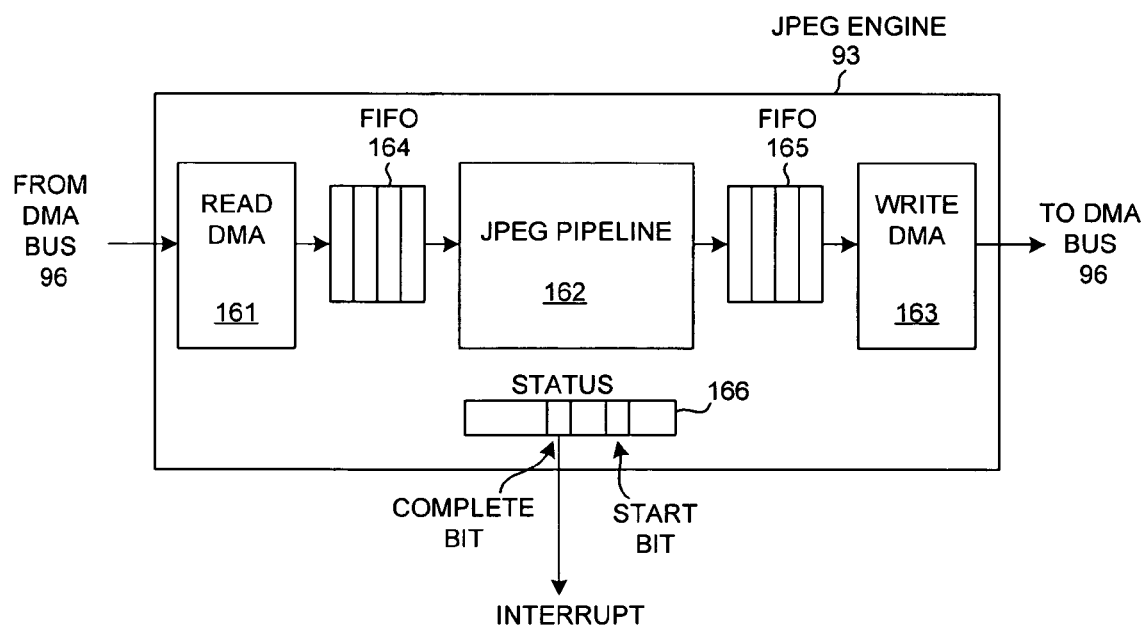
FIG. 25 is a simplified block diagram of JPEG engine 93 of the camera of FIG. 7.

FIG. 25 is a block diagram of JPEG engine 93. JPEG engine 93 includes a read DMA engine 161, a JPEG pipeline 162, and a write DMA engine 163. Image information passing from the read DMA engine 161 to JPEG pipeline 162 is buffered in FIFO 164. Similarly, image information passing from JPEG pipeline 162 to write DMA engine 163 is buffered in FIFO 165.

Once zoomed image information starts flowing into SDRAM 56, ARM processor 95 writes registers in JPEG compression engine 93 to inform read DMA engine 161 where the image information begins in SDRAM 56. Read DMA engine 161 of JPEG engine 93 then starts transferring the zoomed image information out of SDRAM 56 and into FIFO buffer 164.

JPEG compression engine 93 performs a discrete cosine transform on blocks of pixels that are eight pixels wide and eight pixel high. JPEG does not use a sliding window, but rather considers an eight by eight pixel block, encodes that, and then moves to the right to the next eight by eight pixel block. Zoomed pixel information is therefore transferred from SDRAM 56 one eight by eight block at a time. Because the first eight by eight block requires pixels from eight rows of zoomed pixels, JPEG compression engine 93 receives the pixel information it needs to start processing with a short DMA delay after the first eight rows of zoomed pixels have been transferred from zoom engine 92 into SDRAM 56. The delay due to JPEG engine 93 is illustrated in FIG. 11 in that the block labeled IMAGE #N in the "JPEG COMPRESSION PROCESSING" row is shifted to the right in time approximately eight rows with respect to the block above it labeled IMAGE #N in the "ZOOM PROCESSING" row. The ARM processor 95 starts the JPEG engine 93 by writing a start bit in a status register 166 within JPEG engine 93.

Once JPEG compressed image information begins to flow into SDRAM 56, a DMA engine 167 within DMA controller/arbiter block 102 starts transferring the JPEG compressed image information out of SDRAM 56 via SDRAM controller 94 and DMA bus 96 and starts storing the information into nonvolatile storage. In the present example, the JPEG compressed image is written into SDIO removable flash card 57 via SDIO interface 99. Each JPEG compressed image is stored as one discrete JPEG file with header information and with a JPEG quantization table. When JPEG engine 93 has completed compressing the current frame, a complete bit is set in status register 166 and an interrupt signal is sent to ARM processor 95.

In the event that a compression technique other than JPEG is to be applied (for example, MPEG2), then a compression device external to the image processing integrated circuit 55 can be coupled to receive image information from the digital video interface (see FIG. 9). The output of the external compression device can then be supplied back to the image processing integrated circuit 55 through the DMA controller (DMA CNTRL) illustrated in the bottom left corner of FIG. 9.

In the example of FIG. 11, the storing of the JPEG file is completed at time 148. The total amount of time 149 required to capture an image from the rising edge of the mechanical shutter signal to the completion of the storage of the compressed JPEG file into nonvolatile memory is approximately 0.5 seconds. As illustrated in FIG. 11, by time 148 when the first image (IMAGE N) has been stored into nonvolatile memory, the capturing of the next image (IMAGE N+1) has already begun and the beginning of the next image is being processed by DIP 91. Note that the dashed line that marks time 148 intersects the block labeled IMAGE N+1 in the "BAYER-TO-RGB PROCESSING" row. The processing of an image and the subsequent image therefore overlap one another such that images are image processed, zoomed, compressed, and written into nonvolatile memory as discrete files at the maximum image capture frame rate of the CCD image sensor.

Figure 26:
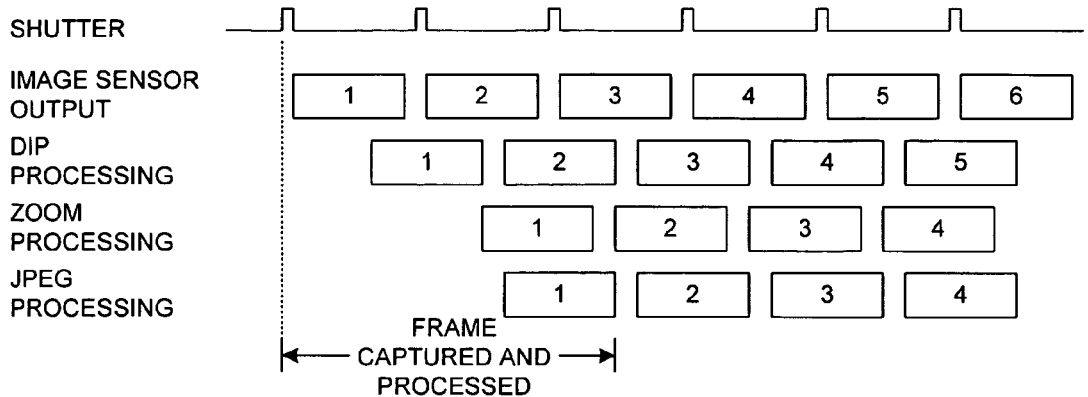
FIGS. 26-30 illustrate other examples of pipelining used to realize continuous full-resolution burst mode operation.

In the example of FIG. 11, zoom engine 92 begins processing IMAGE N before the backend resizer within DIP 91 has completed outputting pixel information from IMAGE N. This need not be the case. FIG. 26 illustrates another embodiment in accordance with the invention. In this embodiment, DIP 91 has completed outputting pixel information of an image before zoom engine 92 begins processing image information from that image. Note that the block labeled "1" in the row labeled "ZOOM PROCESSING" does not overlap in time the block labeled "1" in the row above labeled "DIP PROCESSING". JPEG engine 93 does, however, start processing image information for image "1" before zoom engine 92 has completed outputting pixel information for image "1".

Figure 27:
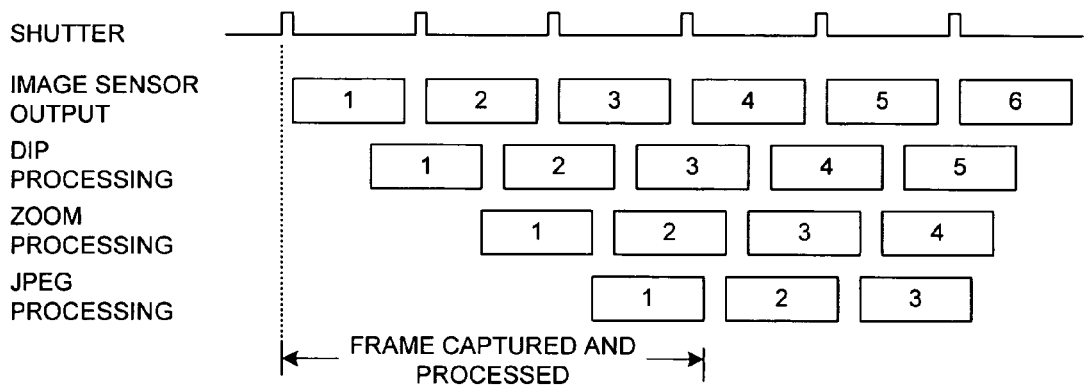

FIG. 27 illustrates an embodiment in accordance with the invention. In this embodiment, JPEG engine 93 does not start processing image information for image "1" before zoom engine 92 has completed outputting pixel information for image "1". Note that the block labeled "1" in the row labeled "JPEG PROCESSING" does not overlap in time the block labeled "1" in the row above labeled "ZOOM PROCESSING". DIP 91 does, however, start processing image information for image "1" before all the Bayer data for image "1" has been read out of the image sensor.

Figure 28:
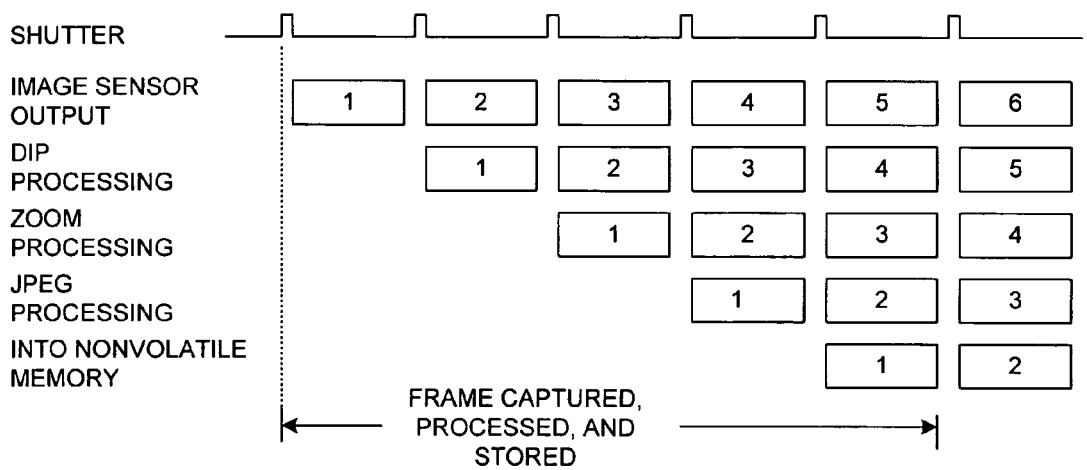

FIG. 28 illustrates another embodiment in accordance with the invention. In this embodiment, there is no overlap in time between the output of Bayer data from image sensor 53, the processing of DIP 91, the processing of zoom engine 92, the processing of JPEG engine 92, and the transfer of the JPEG compressed image into nonvolatile storage 57. At any given time, each of DIP 91, zoom engine 92 and JPEG engine 92 processes image information of a different image. In the embodiment of FIG. 28, ARM processor 95 controls when the DIP, zoom engine and JPEG compression engines start and orchestrates which image each of the engines is working on.

Figure 29:
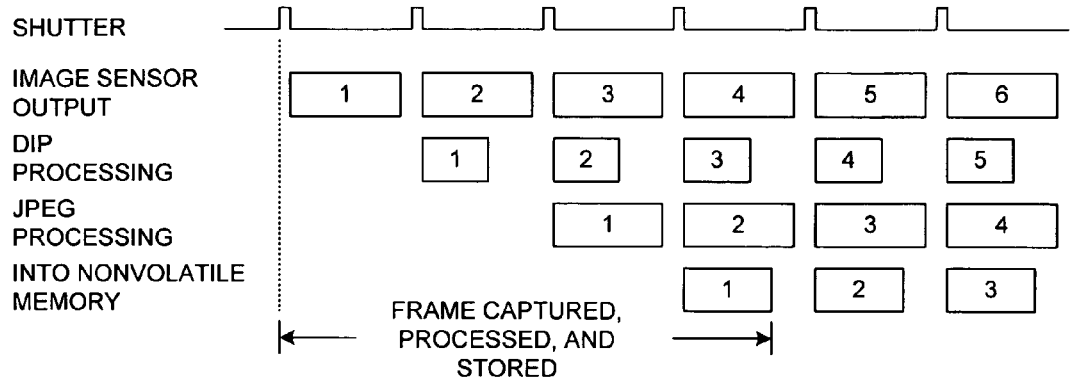
Figure 30:
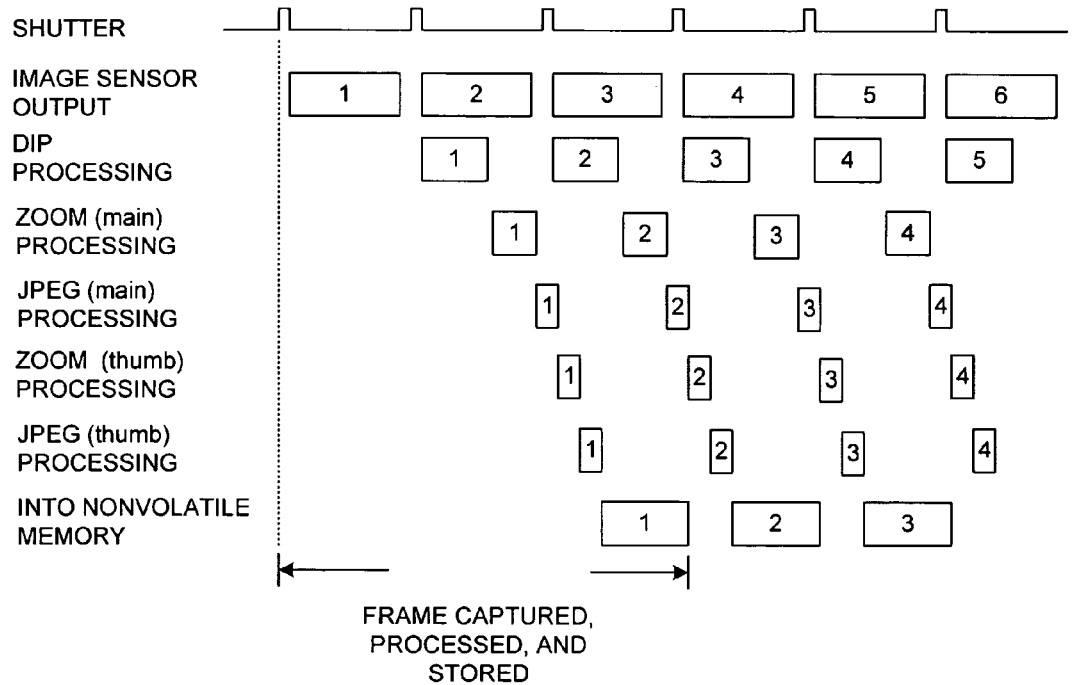

Although the horizontal size of the blocks in FIGS. 26-28 is the same, this is not the case in all embodiments. In the embodiment of FIG. 28, for example, the blocks in one row may be of a different length (and therefore time duration) that the blocks in another row. One of the types of processing may, in some cases, not be performed at all. FIG. 29 illustrates an example in which there is no zoom processing, and wherein the amount of time required for DIP processing is less than the amount of time required for JPEG compression. FIG. 30 illustrates an example in which zoom processing and JPEG processing do not occur simultaneously.

Figure 31:
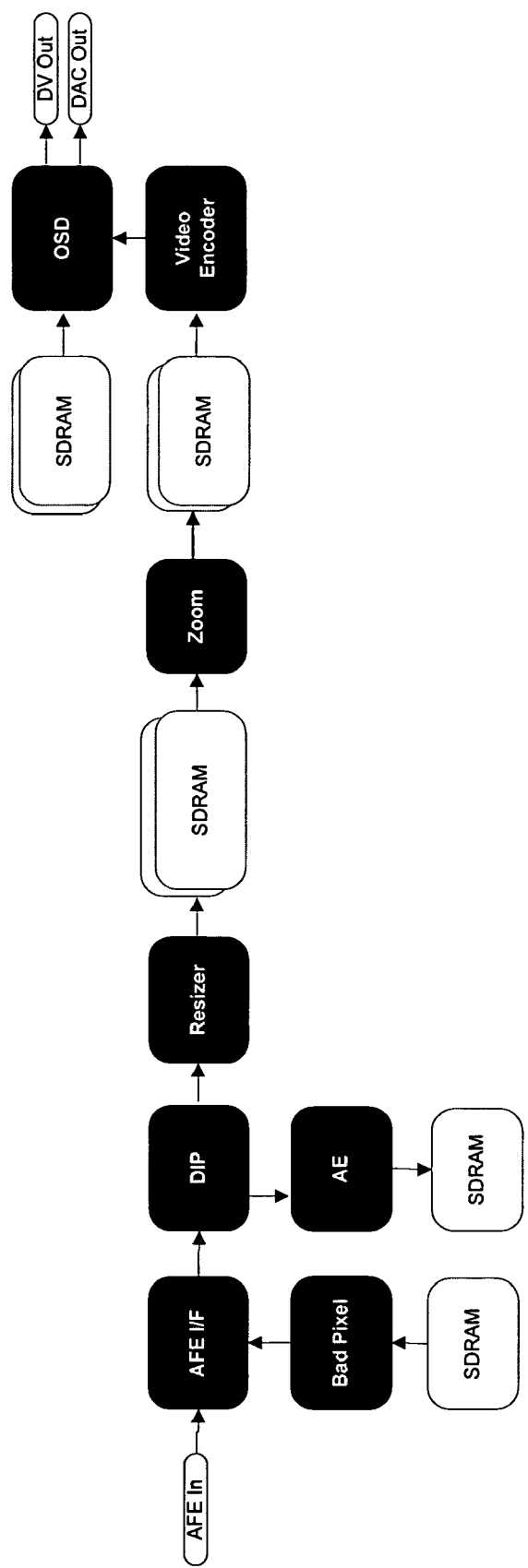
FIGS. 31-36 are flow diagrams that illustrate operation of software and hardware in accordance with one specific embodiment.

FIG. 31 is a flowchart of the flow of data in preview mode where what the sensor is capturing is displayed on the camera display.

Figure 32:
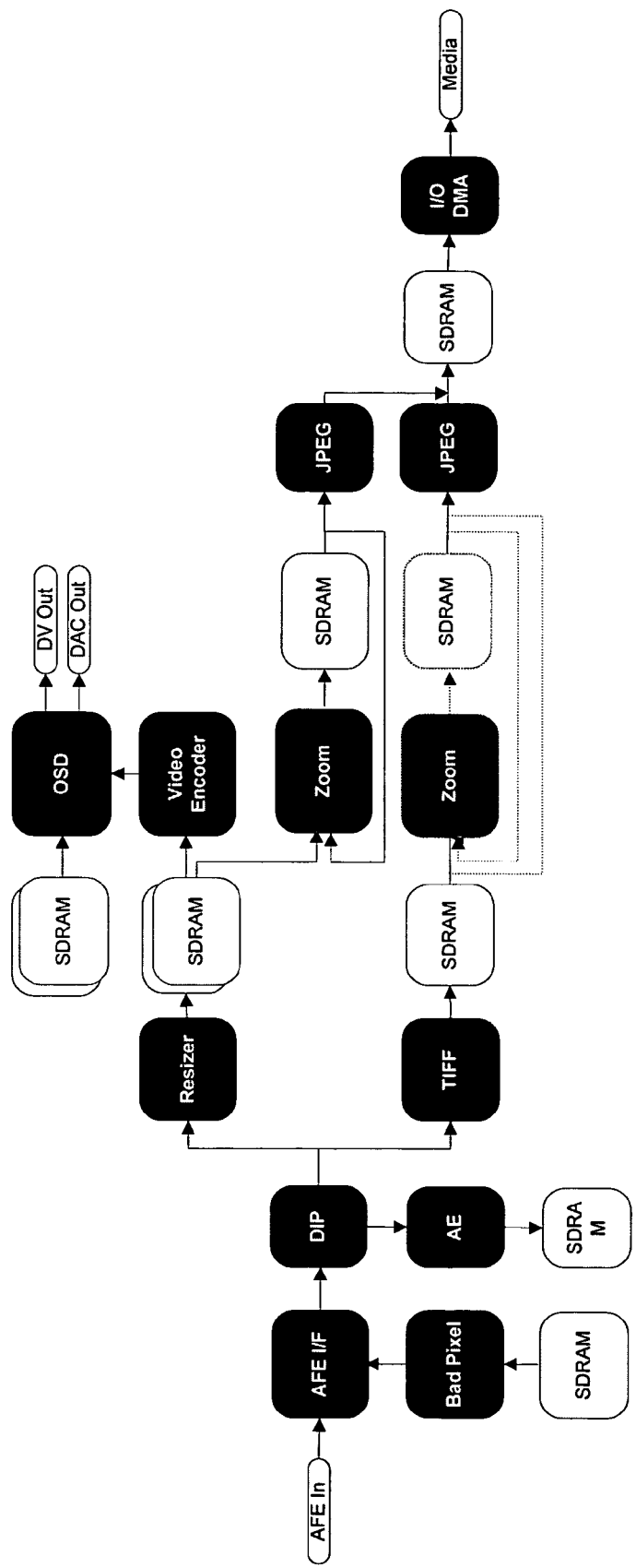

FIG. 32 is a flowchart showing the data flow through software and hardware used for burst capture for a sensor that is progressive. Because it is progressive, raw Bayer data is not buffered in SDRAM and need not be deinterlaced. Rather, the raw pixel data from the sensor goes straight into the AFE interface and through the DIP. Data comes out of the DIP and is supplied to the resizer in order to generate a resized image for the video encoder as well as a thumbnail of the image. The double rounded rectangle symbol in FIG. 32 indicates double buffering. The resized image flows through the video encoder and the on-screen display functionality and is displayed on the screen of the camera. The resized image flows out of the other SDRAM buffer of the double buffer, is zoomed, and is placed into SDRAM. At the same time that data is supplied to the resizer, full image data flows through the TIFF port and through SDRAM and is zoomed and is written into SDRAM. The full image as well as a thumbnail image are then present in SDRAM. Both the thumbnail and the full image are JPEG compressed and are written into SDRAM. The two images are then combined into one .JPG EXIF file. The .JPG EXIF file contains an APP1 header portion and a full image portion. The APP1 header portion contains q tables for the thumbnail image, Huffman tables for the thumbnail image, and the thumbnail image itself. The full image portion contains the main full resolution image, q tables for the full image, and Huffman tables for the full image. The resulting .JPG EXIF file is then written to nonvolatile memory.

Figure 33:
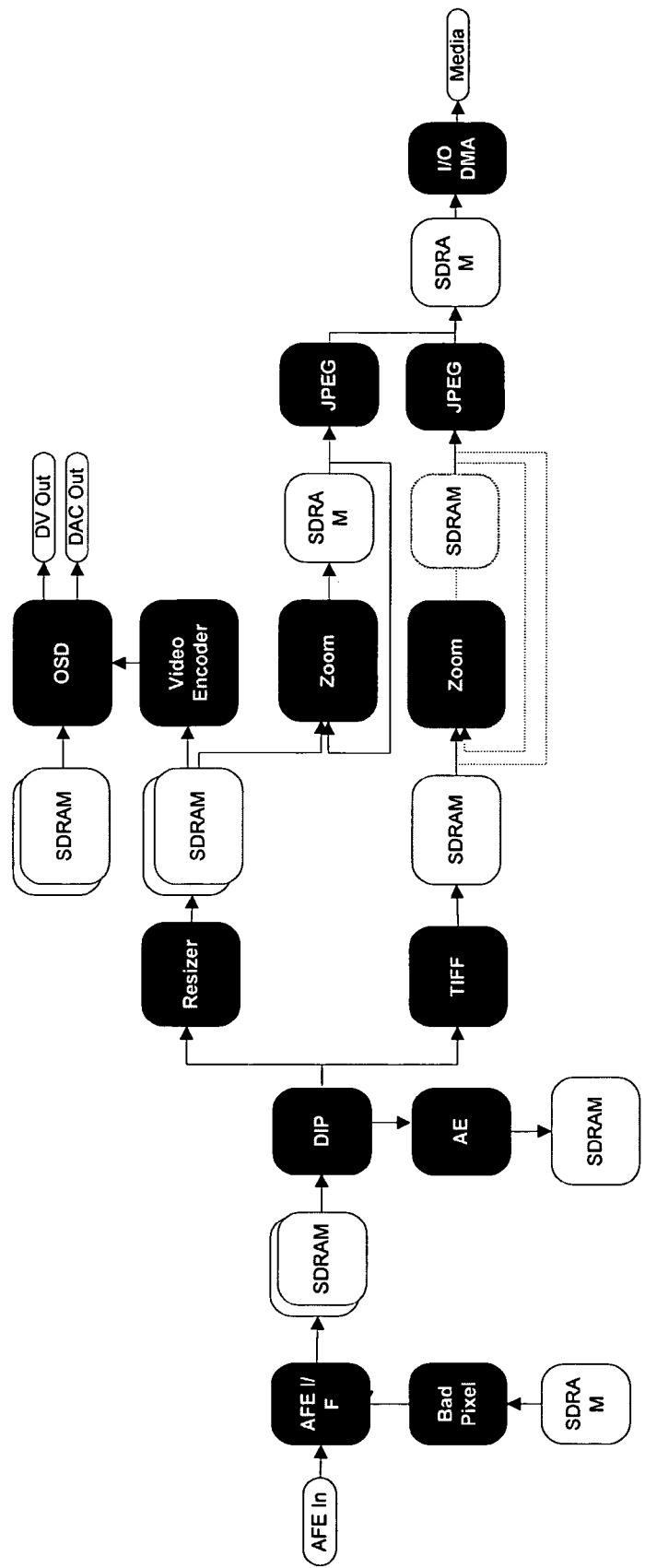

FIG. 33 is a flowchart showing the flow through software and hardware used for burst capture for a sensor that is interlaced (for example, a three field sensor). In contrast to the flow of FIG. 34, the raw image data coming out of the AFE interface flows into SDRAM. The raw image data is read out of the SDRAM in deinterlaced fashion.

Figure 34:
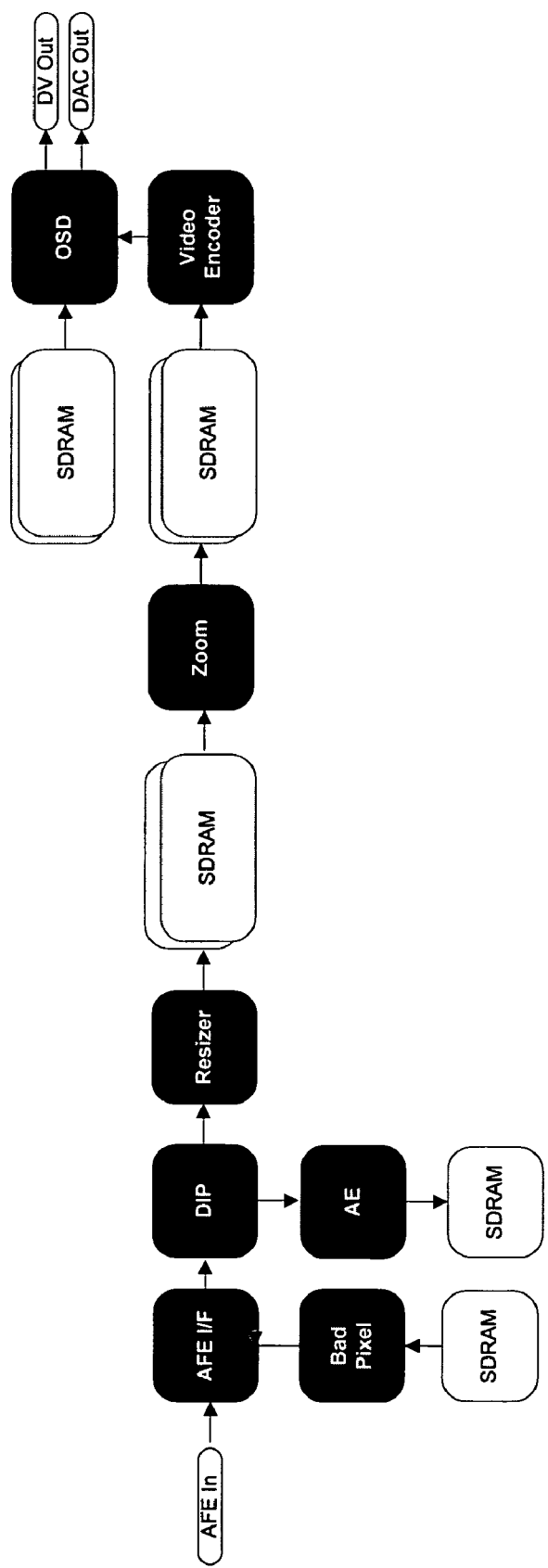

FIG. 34 is a flowchart showing the data flow through the software and hardware in preview mode used for movie capture.

Figure 35:
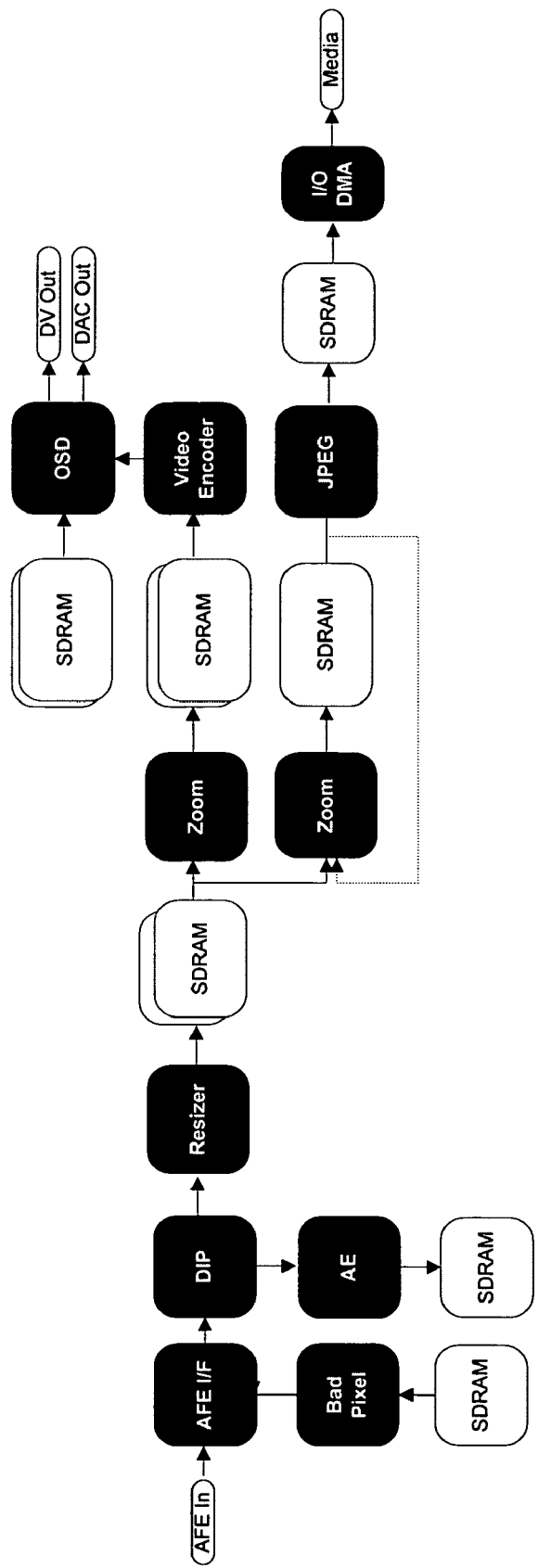

FIG. 35 is a flowchart showing the data flow through the software and hardware for the capture of movies. The data flowing out of SDRAM to the right of the flowchart can, for example, be a Quicktime file or an AVI file.

Figure 36:
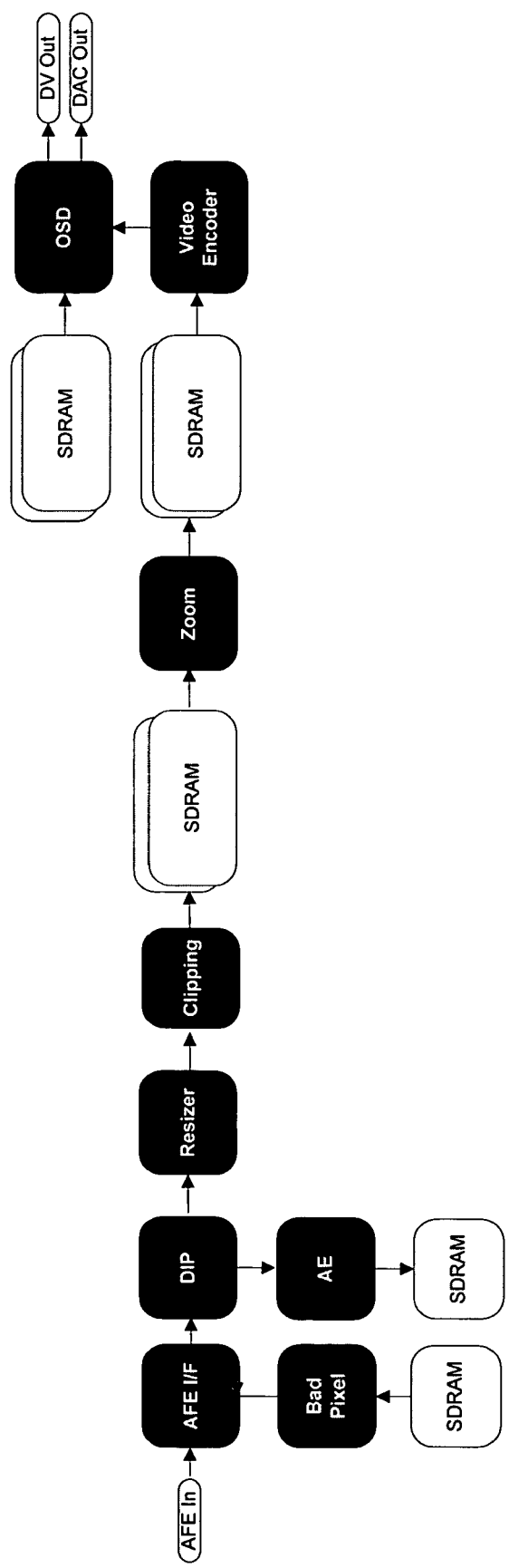

FIG. 36 is a flowchart showing the data flow through the software and hardware pipeline go through the capture MPEG2 files. The output of the OSD processing block corresponds to the R656 interface on FIG. 7. From the R656 interface, the data flows through an external MPEG2 format codec (not shown) which converts the data into an MPEG2 file.

Although the present invention has been described in connection with certain specific embodiments for instructional purposes, the present invention is not limited thereto. Although the continuous burst mode is described above in connection with a sequence of images being captured in a CCD image sensor, other types of images sensors can be used. A complementary metal oxide semiconductor (CMOS) image sensor is employed in some embodiments. The image sensor can be a progressive scan image sensor, or can be an interline image sensor that outputs its sensor data in interlaced rows. The image sensor can also output its sensor data in other patterns. The image sensor can be a Fujifilm "Super CCD" (a honeycomb sensor), a complementary sensor, a sensor that outputs RGB data, and sensor that outputs YUV data after performing color interpolation. Multiple image sensors can be employed together to capture a sequence of images. Although the nonvolatile storage into which the discrete files are stored in the camera of FIG. 7 is flash memory, other types of nonvolatile storage can be used. The nonvolatile storage can, for example, be battery-powered RAM, or a miniature hard disc, or a miniature writable optical disc. The AFE 22 and integrated processing integrated circuit 23 of FIG. 3 see uses outside of still cameras. The AFE and the integrated processing integrated circuit 23 can, for example, be used in such devices as digital video camcorders, security cameras, machine vision applications, digital copiers, personal digital assistants (PDAs), and cellular telephones. The order of image processing functions performed in the pipeline of image processing engines can be changed if desired. Certain image processing functions can be removed if desired. Other image processing functions can be added and incorporated into the chain of pipelined engines in accordance with teachings set forth above for facilitating continuous full-resolution burst mode operation. Although a pipeline processing means is described in connection with the specific example of image processing integrated circuit 55, it is to be understood that integrated circuit 55 is but one example. Rather than realizing each engine in the chain of pipelined engines as a dedicated hardware unit, any of the engines that perform image processing, zooming, or compression in integrated circuit 55 can be realized as a separate processor that runs its own software so that the processor is dedicated to the function of the engine. Files in formats other than the .JPG EXIF format can be stored to non-volatile memory. For example, .JPEG JFIF (JPEG file interchange format) files can be written to non-volatile memory in continuous burst mode. Compression techniques other than JPEG compression can be employed. For example, JPEG2000 or MPEG4 compression can be employed. Accordingly, various modifications, adaptations, and combinations of various features of the described embodiments can be practiced without departing from the scope of the invention as set forth in the claims.

What is claimed is:

1. A digital camera, comprising:
   image capture means for capturing a sequence of at least twenty images and for outputting a stream of sensor data, wherein each image is output by the image capture means as a set of at least five million sensor data values, wherein the image capture means outputs the sensor data values of the stream of sensor data at a sustained average rate of at least three of the sets per second;
   nonvolatile storage; and
   pipeline processing means for receiving the stream of sensor data at the sustained average rate of at least three of the sets per second and for performing color interpolation, gamma correction, color space conversion, zooming, and compression on the sensor data values of the stream of sensor data at the sustained average rate of at least three of the sets per second, generating processed sensor data values of a stream of processed sensor data and thereby outputting a stream of at least twenty files of processed sensor data values of the stream of processed sensor data, wherein each of the files corresponds with a respective one of the at least twenty images in the sequence captured by the image capture means, wherein the pipeline processing means performs zooming on some of the set of sensor data values of the set of at least five million sensor data values before color space conversion has been performed on all of the sensor data values of the set of at least five million sensor data values, and wherein the pipeline processing means is also for storing the stream of files in the nonvolatile storage at a sustained average rate of at least three files per second.

2. The digital camera of claim 1, wherein each of the files is an EXIF file.

3. The digital camera of claim 2, wherein the image capture means includes an image sensor and an analog to digital (A/D) converter.

4. A method comprising:
   (a) capturing a sequence of at least twenty images in an image sensor at a capture and readout frame rate, wherein the image sensor outputs a frame of sensor data of at least five million sensor data values for each image in the sequence, and wherein the image sensor has a maximum sustained full-resolution image frame capture and readout rate (MSFRIFCRR) of at least three frames per second, wherein the capture and readout frame rate is at least the MSFRIFCRR rate;
   (b) using a digital imaging pipeline to perform image processing on each frame of sensor data at a rate at least equal to the MSFRIFCRR and outputting a frame of image processed pixel data corresponding to each frame of sensor data received, wherein the image processing includes color space conversion and zooming, and wherein the digital imaging pipeline zooms some data from each frame of sensor data before performing color space conversion on all of the data of each frame of sensor data;

(c) receiving each frame of image processed pixel data into a JPEG compression mechanism, the JPEG compression mechanism performing JPEG compression at a rate at least equal to the MSFRIFCRR rate and outputting a frame of compressed image data for each frame of image processed pixel data received, the JPEG compression mechanism outputting a sequence of at least twenty frames of compressed image data wherein there is one frame of JPEG compressed image data for each of said at least twenty images captured by the image sensor; and (d) storing the sequence of at least twenty frames of JPEG compressed image data into nonvolatile storage at a rate at least equal to the MSFRIFCRR rate, wherein each frame of JPEG compressed image is stored in nonvolatile storage as a discrete file.

5. The method of claim 4, wherein the image sensor, the digital imaging pipeline, the JPEG compression mechanism and the nonvolatile storage are parts of a battery-powered handheld digital camera.

6. The method of claim 5, wherein the image sensor has at least five million sensors, and wherein each frame of sensor data in the sequence includes at least five million sensor data values.

7. The method of claim 4, wherein the digital imaging pipeline of (b) includes: a Bayer-to-RGB engine, a gamma correction engine, and a zoom engine.

8. The method of claim 4, wherein the image sensor outputs a frame of sensor data for a first image of the sequence of images in a first time period, and wherein a frame of JPEG compressed image data for the same first image is stored into the nonvolatile storage in a second time period, and wherein the first time period overlaps the second time period.

9. The method of claim 4, wherein the image processing of (b) includes performing gamma correction on a first frame of image information associated with the first image of the sequence of images, the gamma correction on the first frame being performed in a first time period, and wherein the processing of (b) further includes performing zoom processing on the first frame of image information associated with the first image of the sequence of images, the zoom processing of the first frame being performed in a second time period, wherein the first time period overlaps the second time period.

10. A digital camera, comprising:
an image sensor having at least five million sensors, wherein the image sensor captures and outputs a sequence of at least twenty full-resolution frames of image data at a capture and readout rate of at least three frames per second; a random access memory (RAM) buffer memory; a pipeline of image processing engines that zooms some data of a frame of image data before performing color space conversion on all of the data of the frame of image data;
a compression engine; and
a nonvolatile storage device, wherein each frame of the sequence of full-resolution frames of image data passes into the RAM buffer, and passes from the RAM buffer, through the pipeline of image processing engines at an average rate of at least three frames per second, through the compression engine at an average rate of at least three frames per second, and is stored as a discrete file into the nonvolatile storage device, and wherein the discrete files associated with said at least twenty images are stored into the nonvolatile storage device at an average frame storage of at least three frames per second.

11. The digital camera of claim 10, wherein the sequence of at least twenty full-resolution frames of image data is digitized into a first number of bits of raw sensor image data, and wherein the RAM buffer memory has a storage capacity of a second number of bits, and wherein the second number of bits is smaller than the first number of bits.

12. The digital camera of claim 10, wherein the compression engine processes a first frame of the sequence of frames at the same time that the pipeline of image processing engines processes a second frame of the sequence of frames.

13. The digital camera of claim 1, wherein the compression engine processes a first frame of the sequence of frames at the same time that the pipeline of image processing engines processes a second frame of the sequence of frames.

14. The digital camera of claim 10, wherein the pipeline of image processing engines comprises a chain of dedicated hardware engines, the dedicated hardware engines including: a Bayer-to-RGB engine, a white balance engine, a gamma correction engine, and a RGB-to-YUV engine.

15. The digital camera of claim 10, further comprising:
a display, wherein the pipeline of image processing engines outputs one reduced size image frame for rendering on the display of the camera for each corresponding one of the discrete files stored into the nonvolatile storage device, wherein the reduced size image frame is rendered on the display at substantially the same time that the corresponding discrete file is stored into the nonvolatile storage device.

16. A digital camera having a continuous full-resolution burst capture mode, the digital camera comprising:
an image sensor having at least five million sensors;
a pipeline of image processing engines;
a zoom engine;
a compression engine; and
a nonvolatile storage device, wherein in the continuous full-resolution burst capture mode: a sequence of at least twenty full-resolution images is captured by the image sensor, wherein each of the full-resolution images is image processed by the pipeline of image processing engines, is zoomed by the zoom engine, is compressed by the compression engine, and is stored into the nonvolatile storage device as a discrete file, wherein the zoom engine zooms some data of an image before the pipeline of image processing engines performs image processing on all of the data of the image, wherein the sequence of at least twenty full-resolution images is captured by the image sensor at a sustained frame rate of at least three frames per second, is image processed by the pipeline of image processing engines at the sustained frame rate of at least three frames per second, is zoomed by the zoom engine at the sustained frame rate of at least three frames per second, is compressed by the compression engine at the sustained frame rate of at least three frames per second, and wherein the discrete files are written into nonvolatile memory at the sustained rate of at least three files per second.

17. The digital camera of claim 16, wherein the digital camera is a battery-powered handheld still camera, and wherein the nonvolatile storage medium is taken from the group consisting of: a flash memory, a hard disk, a microdrive that plugs into a compact flash slot.

18. The digital camera of claim 17, wherein the image sensor outputs for each of the full-resolution images at least five million analog Bayer sensor output values.

19. The digital camera of claim 17, wherein the image sensor is taken from the group consisting of: a charge coupled device (CCD) image sensor, and a complementary metal oxide semiconductor (CMOS) image sensor.

20. The digital camera of claim 16, further comprising:
an analog-to-digital converter that receives raw analog sensor data from the image sensor and digitizes the raw analog sensor data into digital sensor data and supplies the digital sensor data to the pipeline of image processing engines.

* * * * *